United States Patent
White, Jr. et al.

(10) Patent No.: US 12,118,568 B2
(45) Date of Patent: Oct. 15, 2024

(54) SELF-PROVISIONING HUMANOID FOR AUTOMATED CUSTOMER SUPPORT

(71) Applicant: Cisco Technology, Inc., San Jose, CA (US)

(72) Inventors: David C. White, Jr., St. Petersburg, FL (US); Jay K. Johnston, Raleigh, NC (US); Magnus Mortensen, Cary, NC (US); Christopher Shaun Roberts, Spring, TX (US); Felipe De Mello, Holly Springs, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 483 days.

(21) Appl. No.: 17/159,886

(22) Filed: Jan. 27, 2021

(65) Prior Publication Data
US 2022/0237626 A1    Jul. 28, 2022

(51) Int. Cl.
*G06Q 30/016* (2023.01)
*G06N 3/008* (2023.01)
*G06N 20/00* (2019.01)

(52) U.S. Cl.
CPC .......... *G06Q 30/016* (2013.01); *G06N 3/008* (2013.01); *G06N 20/00* (2019.01)

(58) Field of Classification Search
CPC ...... G06Q 30/016; G06N 3/008; G06N 20/00; G06N 5/041
See application file for complete search history.

(56) References Cited

U.S. PATENT DOCUMENTS 10,104,232 B2 *  10/2018  Marrelli ............... G06N 5/04
10,410,626 B1    9/2019  Sherstinsky et al.
(Continued)

FOREIGN PATENT DOCUMENTS

CN   109783510 A      5/2019
JP   2019003267 A *   1/2019
(Continued)

OTHER PUBLICATIONS

Go, "Humanizing chatbots" (Year: 2019).*
(Continued)

*Primary Examiner* — Sangeeta Bahl
(74) *Attorney, Agent, or Firm* — Edell, Shapiro & Finnan, LLC

(57) ABSTRACT

A computer executed process for mimicking human dialog, referred to herein as a "humanoid" or "humanoid system," can be configured to provision itself to provide automated customer support. The humanoid can be trained for a customer support campaign. The training can include the humanoid observing communications between a human operator and at least one customer regarding at least one customer support case in the customer support campaign. The humanoid can assess at least one confidence level of the humanoid for the customer support campaign to determine whether the humanoid is adequately trained to handle future customer support cases for the customer support campaign. The humanoid can provision itself to handle at least one future customer support case in the customer support campaign in response to determining that it is adequately trained for the customer support campaign.

21 Claims, 19 Drawing Sheets

(56) References Cited

U.S. PATENT DOCUMENTS

| | | | |
|---|---|---|---|
| 11,367,080 B2* | 6/2022 | Konig | G06Q 30/01 |
| 11,552,909 B2* | 1/2023 | Lopes de Moraes | G06F 11/3692 |
| 11,562,267 B2* | 1/2023 | Polleri | G06F 40/40 |
| 2006/0155765 A1 | 7/2006 | Takeuchi et al. | |
| 2007/0050191 A1 | 3/2007 | Weider et al. | |
| 2007/0203863 A1 | 8/2007 | Gupta et al. | |
| 2009/0162824 A1 | 6/2009 | Heck | |
| 2009/0245500 A1 | 10/2009 | Wampler | |
| 2013/0218339 A1 | 8/2013 | Maisonnier et al. | |
| 2014/0258286 A1 | 9/2014 | Brown et al. | |
| 2016/0162474 A1 | 6/2016 | Agarwal et al. | |
| 2016/0247068 A1 | 8/2016 | Lin | |
| 2017/0048170 A1 | 2/2017 | Smullen et al. | |
| 2017/0120446 A1 | 5/2017 | Veltrop et al. | |
| 2017/0308531 A1 | 10/2017 | Ma et al. | |
| 2018/0025726 A1 | 1/2018 | Gatti de Bayser et al. | |
| 2018/0131645 A1 | 5/2018 | Magliozzi et al. | |
| 2018/0145934 A1 | 5/2018 | Pappu et al. | |
| 2018/0332170 A1 | 11/2018 | Li et al. | |
| 2018/0367483 A1 | 12/2018 | Rodriguez et al. | |
| 2019/0042988 A1* | 2/2019 | Brown | G06F 9/547 |
| 2019/0121853 A1 | 4/2019 | Cai et al. | |
| 2019/0130310 A1 | 5/2019 | Madhava Rao et al. | |
| 2019/0171845 A1 | 6/2019 | Dotan-Cohen et al. | |
| 2020/0007474 A1 | 1/2020 | Zhang et al. | |
| 2020/0125678 A1 | 4/2020 | Conley et al. | |
| 2020/0142997 A1* | 5/2020 | Kondadadi | G06F 16/3329 |
| 2020/0195782 A1* | 6/2020 | Kannan | H04M 3/5235 |
| 2020/0259891 A1 | 8/2020 | Abraham | |
| 2020/0293946 A1 | 9/2020 | Sachan et al. | |
| 2020/0302123 A1 | 9/2020 | Mittal et al. | |
| 2020/0327196 A1* | 10/2020 | Sampat | G06N 20/00 |
| 2020/0329144 A1 | 10/2020 | Morgan et al. | |
| 2020/0335124 A1 | 10/2020 | Herzig et al. | |
| 2020/0351405 A1* | 11/2020 | Pace | G06F 11/3409 |
| 2021/0073653 A1 | 3/2021 | Maes | |
| 2021/0144107 A1* | 5/2021 | Liang | G06N 5/04 |
| 2021/0158146 A1 | 5/2021 | Singh et al. | |
| 2021/0334473 A1 | 10/2021 | Trehan | |

FOREIGN PATENT DOCUMENTS

| | | |
|---|---|---|
| WO | 2019144773 A1 | 8/2019 |
| WO | 2019184103 A1 | 10/2019 |

OTHER PUBLICATIONS

An initial model of trust in chatbots for customer service (Year: 2019).*

Mateusz Zarkowski, "Multi-party Turn-Taking in Repeated Human-Robot Interactions: An Interdisciplinary Evaluation", International Journal of Social Robotics, Nov. 8, 2019, 15 pages.

Facebook, "Building Bots", retrieved from Internet Sep. 28, 2020, 12 pages. https://developers.facebook.com/docs/workplace/integrations/custom-integrations/bots/#bottogroupchat.

Zendesk, "Answer Bot", retrieved from Internet Jan. 27, 2021, 7 pages; https://www.zendesk.com/answer-bot/.

Wikipedia, "Automated machine learning", last edited Jan. 25, 2021, 1 page; https://en.wikipedia.org/wiki/Automated_machine_learning.

Saama, "Deep Learning and Context Based Intelligent Search", retrieved from Internet Jan. 27, 2021, 2 pages; https://www.saama.com/deep-learning-context-based-intelligent-search/.

Diana Borsa et al., "Observational Learning by Reinforcement Learning", arXiv:1706.06617v1 [cs.LG], Jun. 20, 2017, 10 pages.

\* cited by examiner

600

620

Q-1 Customer (customer@customer.com): Mon Jan 1 2020 01:01:01 GMT (EDT) –1 h 58m 20s ago
so far so good
i applied the firmware update to 9.6.4 on friday afternoon and there have been no reboots since then
i am going to monitor for another day or so myself to be sure Customer (customer@customer.com): Mon Jan 1 2020 01:01:01 GMT (EDT) –1 h 58m 20s ago

610

From: customer@customer.com
To: humanoid@company.com
Cc: operator@company.com
Subject: Support Request 6YZ123; Firmware Update to 9.6.4

So far so good. I applied the firmware update to 9.6.4 on Friday afternoon and there have been no reboots since then. I am going to monitor for another day or so myself to be sure.

615

Thanks,
Customer
t. 123-867-5309  e. customer@customer.com

-----Original Message ----

| P3 689468191 - ASA 5512 is Restarting Most Nights     705 |
|---|
| Fri 10 Jul 2020 09:28am – 04:00 Humanoid Email In |
| From: Humanoid@company.com<br>To: Customer@customer.com<br>Cc:<br>Subject: SR 689468191 – ASA 5512 is Restarting Most Nights<br><br>Hello Customer,<br>My name is Humanoid, and I have ownership of your Support Request: 689468191. I am sending this email as an initial point of contact.<br><br>From your problem description, it sounds like the device might have crashed.<br><br>Log on to the CLI of the device that crashed via SSH/Telnet (Note: this may currently be the STANDBY device if you have an HA failover-pair and the rules have changed).<br>Run the command "term pager 0" to prevent the device from pausing the output with "—More—" prompts<br>Then the command "show crash" and save the output to a text file<br>Then reset the terminal length with "term pager 24"<br>Reply-all to this email and attach that file or go to<br>https://support.company.com/requestID=689468191 and upload the file there.<br><br>Please upload/email plain text files, not rtf and do not zip them.<br><br>I will analyze the crash file and try to determine the bug that is causing it, and how to mitigate the problem.<br><br>Sincerely,<br>Humanoid |

2020-07-10T13:47:08.364+0000 + 0:02:07 -- BDB Event: operator - humanoid_process_asa_crash -- starting sr_id:1689468191 || filename: None
2020-07-10T13:49:34.000+0000 + 0:02:25 -- BORG: BORG Found Bug CSCvi16029 while running 9.4(4)17
                                                    BORG ran on file with crash. Found Crash Bug
2020-07-10T13:52:12.000+0000 + 0:02:38 -- BORG: BORG Found Bug CSCvi16029 while running 9.4(4)17
                                                    BORG ran on file with crash. Found Crash Bug
2020-07-10T13:53:07.694+0000 + 0:00:55 -- BDB Event: operator - humanoid_process_asa_crash -- starting sr_id:1689468191 || filename: None
2020-07-10T13:53:11.453+0000 + 0:00:03 -- BDB Event: operator - humanoid_process_asa_crash -- Owner: humanoid
2020-07-10T13:53:11.454+0000 + 0:00:00 -- BDB Event: operator - humanoid_process_asa_crash -- SubTech: ASA non-VPN problem
2020-07-10T13:53:11.454+0000 + 0:00:00 -- BDB Event: operator - humanoid_process_asa_crash -- actions so far: {'_id':1689468191, 'sent_crash_request':
datetime.datetime(2020, 7, 10, 13, 28, 52, 256000)}
2020-07-10T13:53:15.761+0000 + 0:00:04 -- BDB Event: operator - humanoid_process_asa_crash -- Found 4 crashes
2020-07-10T13:53:15.762+0000 + 0:00:00 -- BDB Event: operator - humanoid_process_asa_crash -- Using 689468191.20200710-083939472_crash_7-7.txt
2020-07-10T13:53:15.762+0000 + 0:00:00 -- BDB Event: operator - humanoid_process_asa_crash -- Using 689468191.20200710-083939472_crash_7-7.txt
2020-07-10T13:53:15.763+0000 + 0:00:00 -- BDB Event: operator - humanoid_process_asa_crash -- Using 689468191.20200710-083939501_crash_7-10.txt
2020-07-10T13:53:15.763+0000 + 0:00:00 -- BDB Event: operator - humanoid_process_asa_crash -- Found existing crash decode
2020-07-10T13:53:19.895+0000 + 0:00:04 -- BDB Event: operator - humanoid_process_asa_crash -- matches ['CSCvi16029']
2020-07-10T13:53:24.000+0000 + 0:00:04 -- Humanoid: Added defect CSCvi16029
2020-07-10T13:53:28.936+0000 + 0:00:04 -- BDB Event: operator - humanoid_process_asa_crash -- Found these emails on the SR: ['customer@customer.com']
2020-07-10T13:53:28.895+0000 + 0:00:00 -- BDB Event: operator - humanoid_process_asa_crash -- Better customer name customer@customer.com -> Customer
2020-07-10T13:53:28.900+0000 + 0:00:00 -- BDB Event: operator - humanoid_process_asa_crash -- Sending email to ['customer@customer.com']
2020-07-10T13:53:29.000+0000 + 0:00:00 -- humanoid:

810

Decoded and analyzed crash data and determined that the crash is related to bug CSCvi16029. Sent information about bug, and fixed builds to the customer 2020-07-10T13:59:31.000+0000 + 0:00:02 -- humanoid:

Touch base with customer and ensure there are no further questions regarding this bug.

FIG. 8

SELF-PROVISIONING HUMANOID FOR AUTOMATED CUSTOMER SUPPORT

TECHNICAL FIELD

The present disclosure relates to providing automated customer support using a humanoid system.

BACKGROUND

Companies often provide customer support in connection with products and/or services. For example, computing and network equipment and services providers typically offer technical customer support to address customer issues related to the equipment and services, such as computer crashes or other malfunctions, network outages, etc. Customers expect their issues to be addressed timely and effectively.

However, staffing resource limitations often can cause customer issues to "queue up" with long wait times. Inexperienced support staff also may provide ineffective and/or inefficient service. These issues are compounded when unpredictable, large-scale events cause surges of customer support requests in excess of staffing capacity.

BRIEF DESCRIPTION OF THE DRAWINGS

FIG. 6 is a diagram depicting an inbound communication processing operation of a humanoid system, according to an example embodiment.

FIG. 7 is a diagram depicting an outbound communication processing operation of a humanoid system, according to an example embodiment.

FIG. 8 is a diagram depicting a support action execution operation of a humanoid system, according to an example embodiment.

DESCRIPTION OF EXAMPLE EMBODIMENTS

Overview

Figure 1:
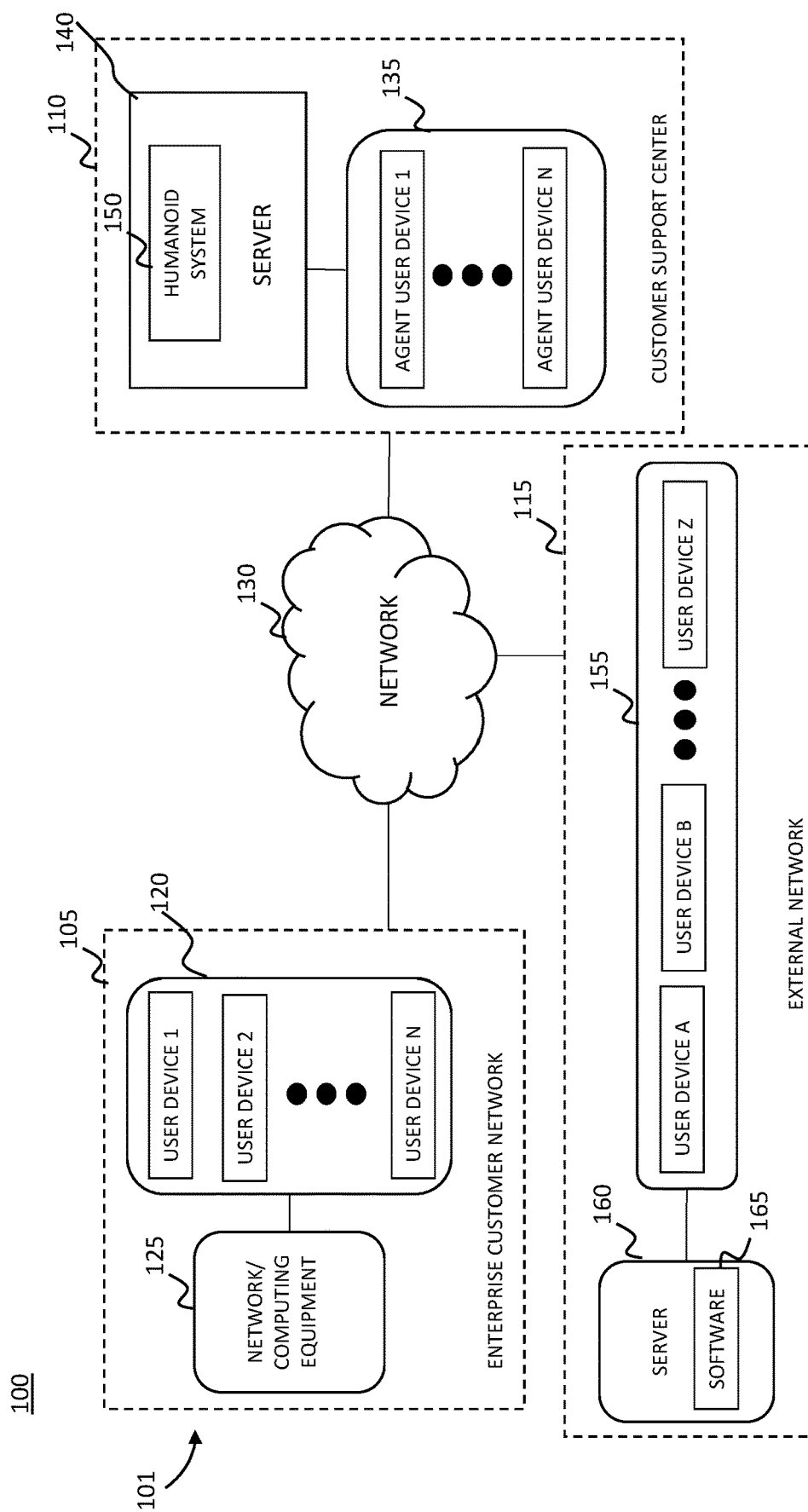
FIG. 1 is a diagram of a system for providing automated customer support, according to an example embodiment.

A computer executed process for mimicking human dialog, referred to herein as a "humanoid" or "humanoid system," can be configured to provision itself to provide automated customer support. The humanoid can be trained for a customer support campaign. The training can include the humanoid observing communications between a human operator and at least one customer regarding at least one customer support case in the customer support campaign. The humanoid can assess at least one confidence level of the humanoid for the customer support campaign to determine whether the humanoid is adequately trained to handle future customer support cases for the customer support campaign. The humanoid can provision itself to handle at least one future customer support case in the customer support campaign in response to determining that it is adequately trained for the customer support campaign.

EXAMPLE EMBODIMENTS

Presented herein are systems and methods for a humanoid system to provision itself to provide automated customer support services. The humanoid is configured to be trained (e.g., through self-learning, supervised learning, unsupervised learning, semi-supervised learning, reinforcement learning, etc.) to address support issues on behalf of a customer support center. For example, the humanoid can use one or more machine learning models and/or custom automation capabilities, which may be refined through the training, to provide the support services. In an example embodiment, the training can include the humanoid automatically observing (e.g., in a "shadow mode") one or more human operators addressing customer support issues, to build knowledge and confidence for the humanoid to handle future, similar support issues.

The humanoid can be configured to self-assess its ability to handle the support issues and to automatically provision itself for handling future support cases when it determines that it is adequately trained to do so. In this context, "provisioning" involves activating the humanoid, or a feature or function associated with the humanoid, to enable (potentially automatic) handling by the humanoid of future support cases as appropriate. For example, provisioning may involve adding, removing, changing, or updating a flag, setting, and/or other feature associated with the humanoid, e.g., in a database or other structure.

The support issues can include any technical, product, service, or other issue to be addressed for, or on behalf of, a customer. The support issues can include, e.g., issues for which customers have requested information and/or assistance, as well as issues detected by the humanoid or another system independent of any customer requests. For example, for any types of support issues for which the humanoid is provisioned, the humanoid can receive a support request directly from a customer, intercept a support request directed to a human operator at the customer support center, take over a support case previously being handled by a human operator at the customer support center, or proactively initiate a support case in response to a support issue being detected by the humanoid or another system.

In an example embodiment, the humanoid is configured to handle, and/or be trained to handle, support issues corresponding to multiple different types of customer support campaigns. Each customer support campaign is a different type of customer issue for which customer support may be provided. For example, there may be a customer support campaign for a network outage, a computer crash or other malfunction, a provision of software, hardware, a license, or a return merchandise authorization ("RMA"), and/or any other type of support matter. There may be at least one machine learning model or other automation capability associated with each customer support campaign. For example, each customer support campaign may have a different machine learning model, which may be trained for facilitating communications by the humanoid in connection with the customer support campaign. The humanoid may be provisioned, for example, on a customer support campaign by customer support campaign basis, if and as the humanoid (and its corresponding machine learning models, as applicable) is trained to provide support for the respective customer support campaign.

The humanoid can be configured and/or trained to execute one or more support actions, e.g., by cooperating with at least one system external to the humanoid and/or taking another action, to resolve the support issues. The humanoid can be configured and/or trained to resolve the support issues like an actual human would, though potentially at a greater speed and with more accuracy than a human. In an example embodiment, the humanoid can be configured and/or trained to resolve a support issue for a customer end-to-end without an actual human communicating with the customer. For example, the humanoid may provide automated support in a manner such that the customer receiving the support believes they are communicating directly with a human rather than with a machine.

In an example embodiment, training of the humanoid for a customer support campaign can include the humanoid observing communications between a human operator and at least one customer regarding at least one customer support case in the customer support campaign. The humanoid can process questions and answers from the communications to build a knowledge base with which the humanoid may potentially handle future cases itself, i.e., without the human operator communicating with the customer. For example, the humanoid can harvest questions and answers from the communications, group similar questions, and analyze the answers to determine a best answer for each grouping. As may be appreciated, when multiple different customers encounter the same support issue, the customers may ask similar questions; by grouping these questions (and their corresponding answers) for the same support issue, the humanoid can be trained to learn the different ways customers ask similar questions, while also learning how to answer the questions to resolve the support issue like a human would.

In an example embodiment, the humanoid can cause the best answer for a particular question (or question grouping) to be displayed or presented to the human operator as a proposed answer for potential provision by the human operator to the customer. For example, the humanoid may provide the proposed answer to the human operator if the humanoid determines that the proposed answer has a confidence score above a predetermined threshold. The display or presentation may include one or more inputs, which the human operator may selectively activate to accept or reject the proposed answer. For example, the human operator may activate an input to cause the proposed answer (either verbatim or edited) to be automatically included in a communication from the human operator to the customer. The human operator's behavior in response to the display may provide a feedback loop for dynamically training, and/or adjusting one or more confidence levels of, the humanoid. For example, if the human operator uses the proposed answer provided by the humanoid verbatim, a confidence level of the humanoid (and/or one or more machine learning models used by the humanoid) may be increased, whereas, if the human operator does not accept the proposed answer provided by the humanoid or materially alters the proposed answer provided by the humanoid, logic of the humanoid (e.g., in the one or more machine learning models) may be refined to reflect that decision, and a confidence level of the humanoid (and/or the one or more machine learning models) may be decreased.

The humanoid can assess one or more confidence levels (sometimes called a "confidence score") of the humanoid for the customer support campaign to determine whether the humanoid is adequately trained to be provisioned to handle future cases itself. A confidence level can include any probability, percentage, number, or other value, which may be measured. For example, the humanoid can review each of one or more questions in each of a threshold number of cases in a customer support campaign to determine whether the humanoid has answers with confidence levels greater than a threshold amount for at least a threshold amount of questions in at least a threshold amount of cases. As may be appreciated, the numbers and types of considerations involved in this self-assessment (e.g., the numbers and types of confidence levels and thresholds) may vary. For example, higher confidence levels and/or threshold amounts may be desirable for complex customer support campaigns, while lower confidence and/or threshold amounts may be adequate for simple customer support campaigns.

Merely for ease of description, the techniques presented herein are primarily described with reference to a specific type of customer support, namely technical support for computing and networking equipment. However, it is to be appreciated that the techniques presented herein may be implemented for any type of customer support services, whether technical in nature or otherwise.

Referring initially to FIG. 1, an example system 100 for providing automated customer support can include an enterprise customer network 105 of a customer 101, a customer support center 110, and an external network 115. The customer 101 is a company or other entity/enterprise that receives support services from the customer support center 110. The enterprise customer network 105 includes multiple user devices 120, which are configured to operate within the enterprise customer network 105. Each user device 120 includes a computer or processing system, such as a desktop, laptop, tablet, phone, or other mobile or non-mobile device. Each user device 120 may include, for example, one or more types of displays (e.g., a screen or monitor) and input devices (e.g., a keyboard, mouse, voice recognition, etc.) to enter and/or view information.

The user devices 120 may be configured to communicate with one another and/or one or more other computing devices, e.g., via network/computing equipment 125. The network/computing equipment 125 can include one or more software and/or hardware modules or units, processing or computer systems, and/or circuitry that provides interfaces, connections (wired or wireless), or other pathways for electronic communication. For example, the network/computing equipment 125 can include one or more copper transmission cables, optical transmission fibers, wireless transmission devices, routers, firewalls, switches, gateway computers, and/or edge servers.

The user devices 120 may be configured to communicate with various systems and devices external to the enterprise customer network 105, such as systems and devices of the customer support center 110 and external network 115, via a network 130. The network 130 includes any communications medium for transmitting information between two or more computing devices. For example, the network 130 can include a local area network (LAN), wide area network (WAN), virtual private network (VPN), Intranet, Internet, hardwire connections, modem connections, wireless connections, or combinations of one or more these items.

The customer support center 110 includes multiple agent user devices 135, which are configured to operate within the customer support center 110. The agent user devices 135 can cooperate with a server 140 and/or other network/computing equipment (not shown) to provide technical or other support services to customers, including the customer 101. For example, the agent user devices 135 and server 140 can provide technical support to the customer 101 in connection with the network/computing equipment 125. Each agent user device 135 includes a computer or processing system, such as a desktop, laptop, tablet, phone, or other mobile or non-mobile device. Each agent user device 135 may include, for example, one or more types of displays (e.g., a screen or monitor) and input devices (e.g., a keyboard, mouse, voice recognition, etc.) to enter and/or view information.

The server 140 is a computing device that includes a humanoid system 150. The humanoid system 150 includes software, which when executed by a computer processor, such as a processor of the server 140, can mimic human dialog. For example, the humanoid system 150 can be configured to participate in conversations involving the humanoid system 150 and one or more user devices 120 and/or agent user devices 135 to provide customer support services to the customer 101. The humanoid system 150 also can observe conversations involving one or more user devices 120 and one or more agent user devices 135 to build knowledge and confidence for handling support issues. For example, the humanoid system 150 can process information from communications between a human operator communicating via an agent user device 135 and a customer communicating via a user device 120 to develop expertise for the humanoid system 150 to provide support services for future support issues. The humanoid system 150 is described in more detail below with reference to FIGS. 2 and 3.

The external network 115 includes multiple user devices 155, which are configured to operate within the external network 115. For example, the user devices 155 can cooperate with a server 160 and/or other network/computing equipment within or outside of the external network 115 to perform auxiliary services in connection with the customer support services of the customer support center 110. Each user device 155 includes a computer or processing system, such as a desktop, laptop, tablet, phone, or other mobile or non-mobile device. Each user device 155 may include, for example, one or more types of displays (e.g., a screen or monitor) and input devices (e.g., a keyboard, mouse, voice recognition, etc.) to enter and/or view information.

The server 160 is a computing device that includes software 165, which when executed by a computer processor, such as a processor of the server 160, can aid in the provision of the auxiliary support services. For example, the user devices 155 and software 165 can cooperate to solve problems or otherwise take action to address a customer support issue being handled by the customer support center 110.

Figure 2:
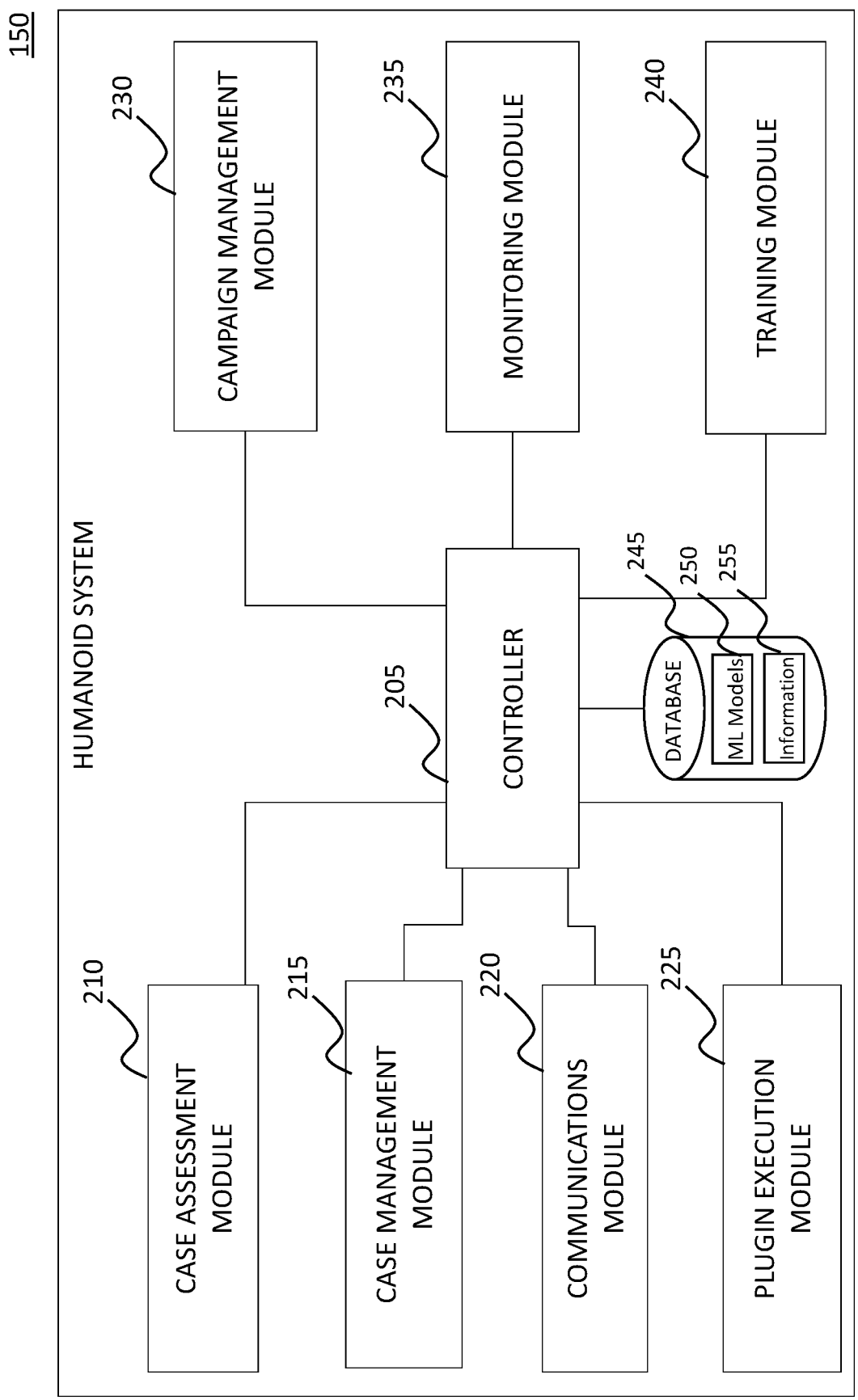
FIG. 2 is a block diagram of a humanoid system for providing automated customer support, according to an example embodiment.
Figure 3:
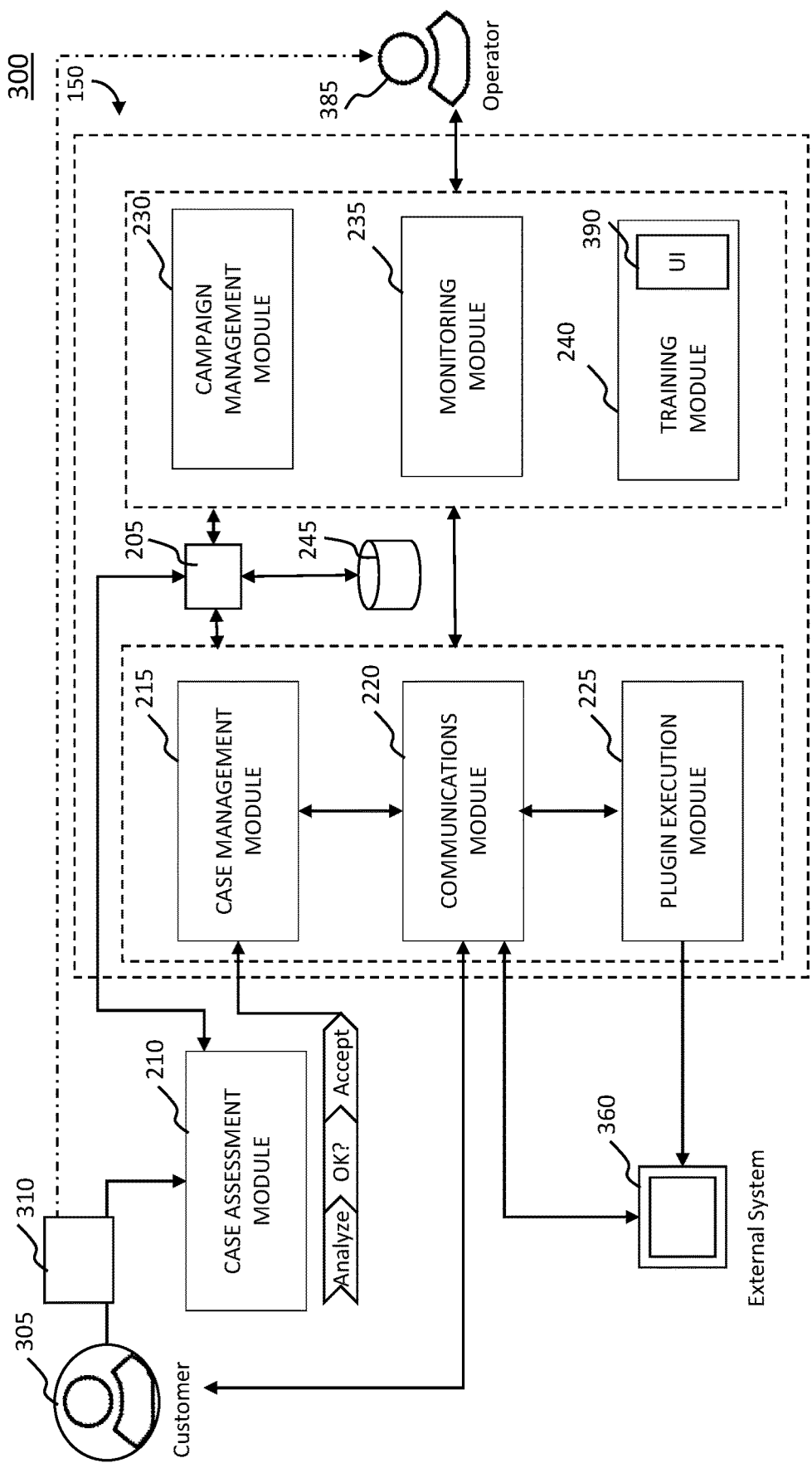
FIG. 3 is a diagram depicting an operational flow for providing automated customer support using a humanoid system, according to an example embodiment.

FIG. 2 is a block diagram of the humanoid system 150, according to an example embodiment. FIG. 3 is a diagram depicting an operational flow 300 for providing automated customer support using the humanoid system 150, according to an example embodiment. FIGS. 2 and 3 are described together for ease of description.

The humanoid system 150 includes a controller 205, which is operatively coupled to, and configured to send instructions to, and receive instructions from or for, various modules of the humanoid system 150, including: a case assessment module 210, a case management module 215, a communications module 220, a plugin execution module 225, a campaign management module 230, a monitoring module 235, and a training module 240. The controller 205 and modules generally cooperate to provide automated customer support.

The case assessment module 210 is configured to monitor incoming support requests and determine, for each support request, whether to have the support request handled by the humanoid system 150 or a human operator or another resource outside of the humanoid system 150. For example, the case assessment module 210 can be configured to receive support requests directly from customers and/or, as depicted in FIG. 3, to intercept support requests 310 that are directed from a customer 305 to a human operator 385. The case assessment module 210 also can be configured to proactively identify support issues, e.g., in response to detection of a problem or other matter potentially of interest to one or more customers by the humanoid system 150 or another system, without any support request being provided by or on behalf of a customer. For example, the case assessment module 210 can detect a system or network outage, malfunction, or other issue, and proactively create a support case in connection with which the humanoid system 150 can notify the customer(s) and facilitate remediation or other steps for resolution of the support case. For simplicity, the terms "support issue," "support case," and "case" are generally used interchangeably herein to refer to any support matter, and the activities associated therewith, whether the support matter is initiated via a support request, a detection of a support issue, or otherwise.

The case assessment module 210 determines, for each support issue, whether the humanoid system 150 is capable of handling the support issue. For example, the case assessment module 210 can read or otherwise identify information regarding the support issue (e.g., in a title or problem description field of any support request and/or any attached log files) and use that information (e.g., as an input to one or more regex matching rules and/or machine learning logic) to determine whether the support issue corresponds to an existing customer support campaign. If the support issue corresponds to an existing customer support campaign, the case assessment module 210 can determine whether the humanoid system 150 has been fully trained or otherwise configured to handle support issues for the existing customer support campaign. For example, the case assessment module 210 may determine that the humanoid system 150 has been fully trained or otherwise configured to handle support issues for the customer support campaign if the humanoid system 150 has been provisioned for handling customer support cases for the customer support campaign. If the support issue does not correspond to an existing customer support campaign, or if the humanoid system 150 has not been fully trained or otherwise configured to handle support issues for a corresponding customer support campaign, the case assessment module 210 may determine that the humanoid system 150 is not capable of handling the support issue and may, therefore, cause the support issue to be handled by a human operator or another resource outside of the humanoid system 150.

In an example embodiment, the case assessment module 210 also may consider whether a confidence score for addressing the customer's particular support issue is above a predetermined threshold when determining whether, and to what degree, to have the humanoid system 150 handle the support issue. For example, if a machine learning model indicates that the humanoid system 150 can address the customer's support issue (e.g., by answering a question, fulfilling a request, or otherwise) with a confidence score above a predetermined threshold, the case assessment module 210 may determine to have the humanoid system 150 handle the support issue. If the confidence score is below the predetermined threshold, the case assessment module 210 may, e.g., determine to not have the humanoid system 150 handle the support issue, or may have a human operator supervise handling of the support issue by the humanoid system 150, or may cooperate with one or more other resources inside or outside of the humanoid system 150 to increase the confidence score so that the humanoid system 150 can handle the support issue. For example, if a support issue is raised for a connected device, the case assessment module 210 could cause the humanoid system 150 to reach out to that connected device proactively to obtain information for processing to increase the confidence score, e.g., by confirming that the support issue matches a particular, trained customer support campaign and not another, untrained customer support campaign.

In an example embodiment, the case assessment module 210 can determine whether the humanoid system 150 is capable of handling the support issue by referencing information stored in one or more databases internal to the humanoid system 150 or external to the humanoid system 150, such as a database 245. The database 245 includes one or more machine learning models 250 and/or other information 255 and/or resources for handling support issues. For example, the database 245 can store in the information 255 an indication (e.g., a flag, setting, and/or other feature) for each customer support campaign, each machine learning model, and/or each particular support issue, as applicable, whether the humanoid system 150 is fully trained and provisioned. Each of the machine learning models 250 may be trained and/or untrained, e.g., through supervised learning, unsupervised learning, semi-supervised learning, reinforcement learning, and/or self-learning, and may include or have associated therewith one or more algorithms, data, and/or other logic.

In an example embodiment, the machine learning models 250 and information 255 are specifically tailored to each of various different types of customer support campaigns. For example, for each customer support campaign, the database 245 can include one or more machine learning models 250 that have been trained to facilitate communications by the humanoid system 150 in connection with the customer support campaign. In an example embodiment, the case assessment module 210 can determine to have the humanoid system 150 handle a particular support issue only if the humanoid system 150 has been provisioned for a customer support campaign corresponding to the support issue, with the database 245 including at least one trained machine learning model for the customer support campaign. This approach can, e.g., eliminate the possibility of the humanoid system 150 communicating information to a customer that is unrelated to the customer's case.

The database 245 can include any data stores or storage structures (e.g., files, databases, data structures, data or other repositories, etc.) that are configured to store information. Though depicted in FIGS. 2 and 3 as being located within the humanoid system 150 (and, therefore, the server 140 (FIG. 1)), it should be recognized that the database 245 could be located remote from the humanoid system 150 (and/or server 140), e.g., in a cloud or data center solution, in alternative example embodiments.

In an example embodiment, the case assessment module 210 can be further configured to reassign handling of support cases. For example, the case assessment module 210 can reassign a support case being handled by a human operator to the humanoid system 150 in response to a reassignment request from the human operator. The human operator may submit a reassignment request, e.g., upon determining that the humanoid system 150 is capable of handling all remaining work required to resolve a support case. For example, if a human operator determines that a customer's issue requires a software upgrade, which is not yet available, the human operator may "offload" the case to the humanoid system 150 to automatically monitor the status of the software release, keep the customer up-to-date, notify the customer once the software is available, automatically deploy the software once available, verify the customer's download and installation of the software, and confirm that the customer's issue is resolved, thereby freeing the human operator to complete other tasks. Alternatively, the case assessment module 210 can be configured to monitor handling of the case by the human operator and proactively initiate case reassignment (without receiving a reassignment request from the human operator) upon a determination that the case is at a stage where the humanoid system 150 is capable of completing all remaining work required to resolve the case. For example, the humanoid system 150 can complete an automatic follow-up of a human operator's backlog of cases to remove remedial work from the human operator.

In an example embodiment, the case assessment module 210 can be configured to consider additional factors, such as one or more characteristics of the customer, when determining whether to assign (or reassign) a case to the humanoid system 150. For example, business rules may be established so that only certain customers or certain types of customers are handled by the humanoid system 150. For example, the business rules could provide for personal support from a human operator to be delivered to customers subscribing to a particular level of support services, regardless of any capabilities or other settings of the humanoid system 150.

The case management module 215 is configured to manage the handling of support cases assigned to the humanoid system 150. For example, in cooperation with the controller 205, the case management module 215 can accept a case assignment from the case assessment module 210 and coordinate with the controller 205, communications module 220, and plugin execution module 225 to communicate and take actions as appropriate to resolve the support case. The case management module 215 can be configured to manage this process in a manner consistent with how a human operator would manage the process. For example, upon acceptance of a new case, the case management module 215 can read or otherwise identify information regarding the case (e.g., in a title or problem description field of any support request for the case) and make an initial determination whether enough information has been provided for the humanoid system 150 to take action to resolve the case. For example, the case management module 215 can, in cooperation with the controller 205, coordinate with the communications module 220, plugin execution module 225, and/or a system external to the humanoid system 150 (such as external system 360) to cause data provided by or for the customer to be processed (e.g., decoding a router crashinfo file), cause a license to be deposited into an online account for the customer, facilitate provision of an item to the customer, etc. As would be appreciated by a person of ordinary skill in the art, the types and complexities of actions can vary widely.

In an example embodiment, the case management module 215 can use the machine learning models 250 and/or information 255 in the database 245 to determine and execute an operation flow for the case. For example, if the case management module 215 determines, upon acceptance of a case, that there is not yet enough information for the humanoid system 150 to take action to resolve the case, the case management module 215 can, in cooperation with the controller 205, coordinate with the communications module 220 to obtain additional information.

The communications module 220 is configured to receive communications, process received communications, prepare communications, and send communications in a manner consistent with a human. Each communication can include an email, instant message, text message, webpage post (e.g., in a discussion forum), chat, voice communication (e.g., involving speech, speech-to-text transcription, and/or text-to-speech transcription), or another type of communication exchanged via an electronic medium. For example, the communications module 220 can read a support request and/or another communication from or for a customer and process the communication to derive a context and/or intent for the support issue, thereby enabling the communications module 220 to interact and respond effectively. The communications module 220 can be configured to cleanse and normalize inbound communications, e.g., using one or more natural language processing models or other logic, to eliminate noise and enable analysis of content therein.

In an example embodiment, the communications module 220 can use one or more machine learning models 250 and/or information 255 in the database 245 to mimic human dialog. For example, the communications module 220 can communicate with the customer and/or one or more external systems (such as external system 360) "as" the humanoid, i.e., with a persona akin to how an actual person would communicate with the customer and/or external systems. Thus, the customer and/or external system(s) can interact with the humanoid system 150 in a manner consistent with, and potentially even with the belief that, they are communicating directly with a human rather than a machine.

The plugin execution module 225 is configured to execute actions and/or coordinate with one or more other systems (outside of the humanoid system 150), such as the external system 360, to resolve support issues. For example, the plugin execution module 225 can use an application program interface (API or "plugin") to process, or cause another module/system to process, data provided by or for the customer, such as decoding a crash file to identify a specific bug causing a problem, recommending software versions, or completing another analysis. The analysis can be, e.g., more complex than an analysis that could ordinarily be completed by a human operator. For example, the analysis can involve complex calculations or tasks beyond simple question and answer capability. The plugin execution module 225 also can (e.g., through one or more plugins and/or through cooperation with the communications module 220) coordinate provision of hardware or software items (e.g., in connection with a purchase order fulfillment, license depositing (or re-hosting), RMA, or other process), etc. The plugin execution module 225 can cooperate with the communications module 220 to cause status, instructions, and/or other information to be shared with the customer.

The campaign management module 230 is configured to oversee operations in connection with each customer support campaign. For example, the campaign management module 230 can create new customer support campaigns and coordinate assignment of, and updates to, machine learning models and/or other information for supporting customer support campaigns. The campaign management module 230 may operate autonomously or via input from one or more human operators, such as human operator 385. For example, one or more human operators can interact with the campaign management module 230 via a user interface provided by the campaign management module 230 to create new customer support campaigns, assign new or different machine learning models or other resources to customer support campaigns, etc.

The monitoring module 235 is configured to enable one or more human operators to supervise activities of the humanoid system 150. For example, the monitoring module 235 can provide a user interface through which a human operator can observe all actions and proposed actions by the humanoid system 150, including viewing communications between the communications module 220 and the customer, and interject as appropriate. The user interface may be the same or different than any user interface provided by the campaign management module 230.

The user interface can, e.g., provide the human operator a view into what the humanoid system 150 is "thinking" and allow the human operator to make adjustments as appropriate. For example, the monitoring module 235 can cause the communications module 220 to echo its communications to the human operator and/or provide proposed communications to the human operator who can provide feedback, such as proposed modifications to the communications and/or proposed information to include in supplemental communications. The humanoid system 150 can complete all actions and participate in all communications with the customer using the feedback from the human operator but without the human operator communicating with the customer.

In an example embodiment, the monitoring module 235 can allow the human operator to choose whether or not to monitor particular actions and/or communications of the humanoid system 150. For example, a human operator may elect to aggressively monitor and interject for support issues that are associated with relatively new customer support campaigns and to forego supervising the humanoid system 150 for support issues corresponding to well established customer support campaigns with one or more fully trained (and confidently correct) machine learning models.

In an example embodiment, the monitoring module 235 can be configured to consider one or more business rules or other factors when determining whether to provide supervision for a particular action or communication by the humanoid system 150. For example, the business rules could provide for oversight only in connection with customers subscribing to a particular level of support services.

The training module 240 is configured to train the humanoid system 150, including e.g., the machine learning models 250, through one or more techniques, such as a self-learning, supervised learning, unsupervised learning, semi-supervised learning, and/or reinforcement learning technique. For example, the training module 240 can be configured to provide a user interface 390 through which a human operator can review and confirm or correct actions, communications, and proposed actions and communications of the humanoid system 150 to refine the machine learning models 250. As would be appreciated by a person or ordinary skill in the art, it could take a few to many instances of seeing a same type of support issue or communication for the humanoid system 150 to be fully trained to handle that type of support issue or communication. For example, training may occur more frequently for matters seen only one to fifteen times as compared to matters seen twenty-five or more times.

In an example embodiment, the training module 240 can be configured to display training data and provide, e.g., through the user interface 390, a mechanism through which the human operator can submit questions against the data, thereby testing one or more machine learning models 250 to see what responses they would give to the questions. The user interface 390 may be the same or different than any user interface provided by the monitoring module 235 or the campaign management module 230. The human operator can provide input through the user interface 390, such as an indication regarding whether a provided response is correct or incorrect or a modification to an answer, to refine the machine learning models 250.

The training module 240 can be further configured with logic for self-training the humanoid system 150 (and/or one or more of the machine learning models 250) through observations of communications between human operators and customers. For example, for a customer support campaign for which the humanoid system 150 is not yet provisioned, and/or for which one or more of the machine learning models 250 is not yet fully trained, the training module 240 can be configured to operate in a "shadow mode," building knowledge and confidence for handling support issues for the customer support campaign through observation. The training module 240, e.g., in cooperation with the controller 205, communications module 220, and/or another module of the humanoid system 150, can process questions and answers from the communications to build a knowledge base with which the humanoid system 150 may potentially handle future support cases itself, i.e., without a human operator communicating with a customer. For example, the training module 240 can harvest questions and answers from the communications, group similar questions, and analyze the answers to determine a best answer for each grouping.

In an example embodiment, the training module 240 can interject in a communication being observed between the human operator and the customer to cause this answer to be proposed to the human operator for potential provision by the human operator to the customer. For example, the training module 240 may cause the proposed answer to be displayed or presented in a user interface 390 (which may or may not be the same user interface described above in connection with the training data) if the training module 240 determines that the proposed answer has a confidence score above a predetermined threshold (e.g., a confidence score greater than or equal to 80%, though the threshold could be greater than 80% or less than 80%). The user interface 390 may include one or more inputs, which the human operator may selectively activate to accept or reject the proposed answer. For example, the human operator may activate an input to cause the proposed answer (either verbatim or edited) to be automatically included in a communication from the human operator to the customer as though it was sent by the human operator themselves. An example embodiment of the user interface 390 is described below with reference to FIG. 11.

The human operator's behavior in response to the proposed answer may provide a feedback loop used for dynamically training, and/or adjusting one or more confidence levels of, the humanoid system 150. For example, if the human operator uses the proposed answer provided by the training module 240 verbatim, a confidence level of the humanoid system 150 (and/or one or more machine learning models 250 used by the humanoid system 150) may be increased, whereas, if the human operator does not accept the proposed answer provided by the training module 240 or materially alters the proposed answer provided by the training module 240, logic of the humanoid system 150 (e.g., in the machine learning models 250 or one or more of the modules of the humanoid system 150) may be refined to reflect that decision, and a confidence level of the humanoid system 150 (and/or the machine learning models 250) may be decreased.

As may be appreciated, providing the proposed answer is optional and may be omitted in certain example embodiments, even where a confidence score for the proposed answer is above a predetermined threshold. For example, the human operator may instruct the training module 240 not to provide proposed answers during a certain timeframe, for certain customers or types or instances of customers or customer support issues, or otherwise.

The training module 240 can assess one or more confidence levels of the humanoid system 150 for the customer support campaign to determine whether the humanoid system 150 is adequately trained to handle future support cases for the customer support campaign. For example, if the training module 240 provided (or knows) the correct answer for at least a threshold percentage of questions (e.g., 85% of the questions, though the threshold could be another value above 85% or below 85%), for at least a threshold number of questions (e.g., five questions, though the number of questions could be above five or below five or the threshold could be omitted in alternative example embodiments) in a support case, the training module 240 can determine that the humanoid system 150 is appropriately trained for that particular support case. The training module 240 can complete this analysis, for example, after the support case is resolved. The training module 240 can perform a similar analysis for a total of at least a threshold number of support cases (e.g., a lookback window of a most recent fifty support cases, though another number and/or set of support cases could be used) to determine whether the training module 240 would have been adequately trained for each of the support cases. For example, if the training module 240 determines that it would have been adequately trained for at least a threshold amount or number of the support cases (e.g., 80% of the support cases, though the threshold could be above 80% or below 80%), then the training module 240 can determine that the humanoid system 150 is adequately trained for the customer support campaign.

As may be appreciated, the numbers and types of considerations involved in this self-assessment (e.g., the numbers and types of confidence levels and thresholds) may vary. For example, higher confidence levels and/or threshold amounts may be desirable for complex customer support campaigns, while lower confidence and/or threshold amounts may be adequate for simple customer support campaigns. Example methods for assessing the ability of the humanoid system 150 to provide automated customer support for a customer support campaign are described in more detail below, with reference to FIGS. 15 and 16.

Though indicated in FIGS. 2 and 3 as discrete logical components, it should be appreciated that the case assessment module 210, case management module 215, communications module 220, plugin execution module 225, campaign management module 230, monitoring module 235, training module 240, controller 205 and database 245 may be reconfigured as or in any number of different components without departing from the spirit and scope of the present disclosure. For example, certain functions and features of the case management module 215, communications module 220, plugin execution module 225, controller 205, and database 245 could be integrated in one or more humanoid execution modules, while certain functions and features of the campaign management module 230, monitoring module 235, training module 240, controller 205, and database 245 could be integrated in one or more humanoid management modules, in alternative example embodiments.

Figure 4:
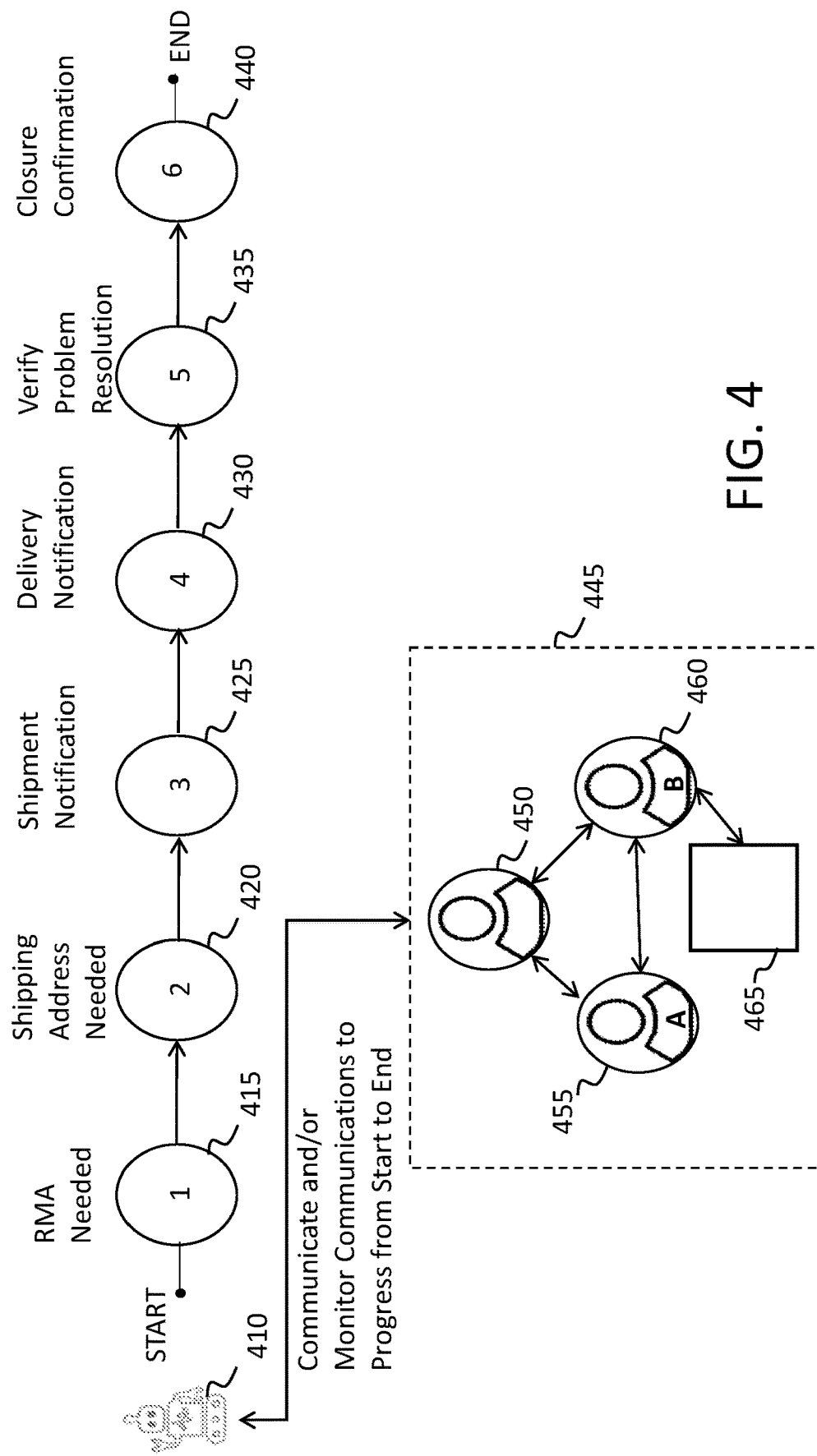
FIG. 4 is a diagram depicting an operational flow for providing automated customer support using a humanoid system, according to another example embodiment.

Turning now to FIG. 4, an example operational flow 400 is shown for providing automated customer support using a humanoid system, according to an example embodiment. The operational flow 400 involves an RMA customer support process by which items can be returned for repair, maintenance, refund, or replacement. As would be recognized by a person of ordinary skill in the art, this type of customer support process is illustrative and should not be construed as being limiting in any way. In particular, the techniques disclosed herein can be used in connection with RMA and non-RMA types of customer support issues without departing from the spirit or scope of this disclosure.

The operational flow 400 is implemented via a humanoid 410, which has been provisioned, and is configured for, providing the customer support by, among other things, communicating with one or more other endpoints 445. For example, the endpoints 445 can include a customer 450, a first person ("PersonA") 455, a second person ("PersonB") 460, and an external system 465. The customer 450, PersonA 455, and PersonB 460 can participate in the communications, e.g., via one or more computing devices.

The humanoid 410 can communicate, directly or indirectly, with one or more of the endpoints 445, and/or observe communications among one or more of the endpoints 445, to collect information for proceeding through the operational flow 400. For example, after determining in a first step 415 that RMA is needed, the humanoid 410 can determine in a second step 420 that it needs a shipping address. The humanoid 410 can ask one or more of the endpoints 445 for the shipping address information and/or monitor communications involving the endpoints 445 to accept (and, optionally, acknowledge) receipt of that information.

In an example embodiment, the humanoid 410 can obtain the information from the communications, regardless of whether the humanoid 410 was the directed recipient of the information. For example, in response to the request from the humanoid 410 or unrelated to the request from the humanoid 410, the customer 450 may send a communication to PersonA 455 (e.g., with a copy to, or otherwise including, the humanoid 410) with the required shipping information. The humanoid 410 may accept and acknowledge the shipping information even though the communication was not directed to the humanoid 410 (e.g., if the humanoid 410 is not identified in the "to:" field of the communication) and even if the communication does not specifically call out the humanoid 410 in a salutation or body of the communication. Upon accepting the shipping information, the humanoid 410 may proceed to prepare a shipment notification in step 425, prepare a delivery notification in step 430, verify problem resolution 435, and confirm closure of the customer support case in step 440. The humanoid 410 may complete these steps directly or in cooperation with one or more external systems, e.g., via one or more of the endpoints 445.

Figure 5A:
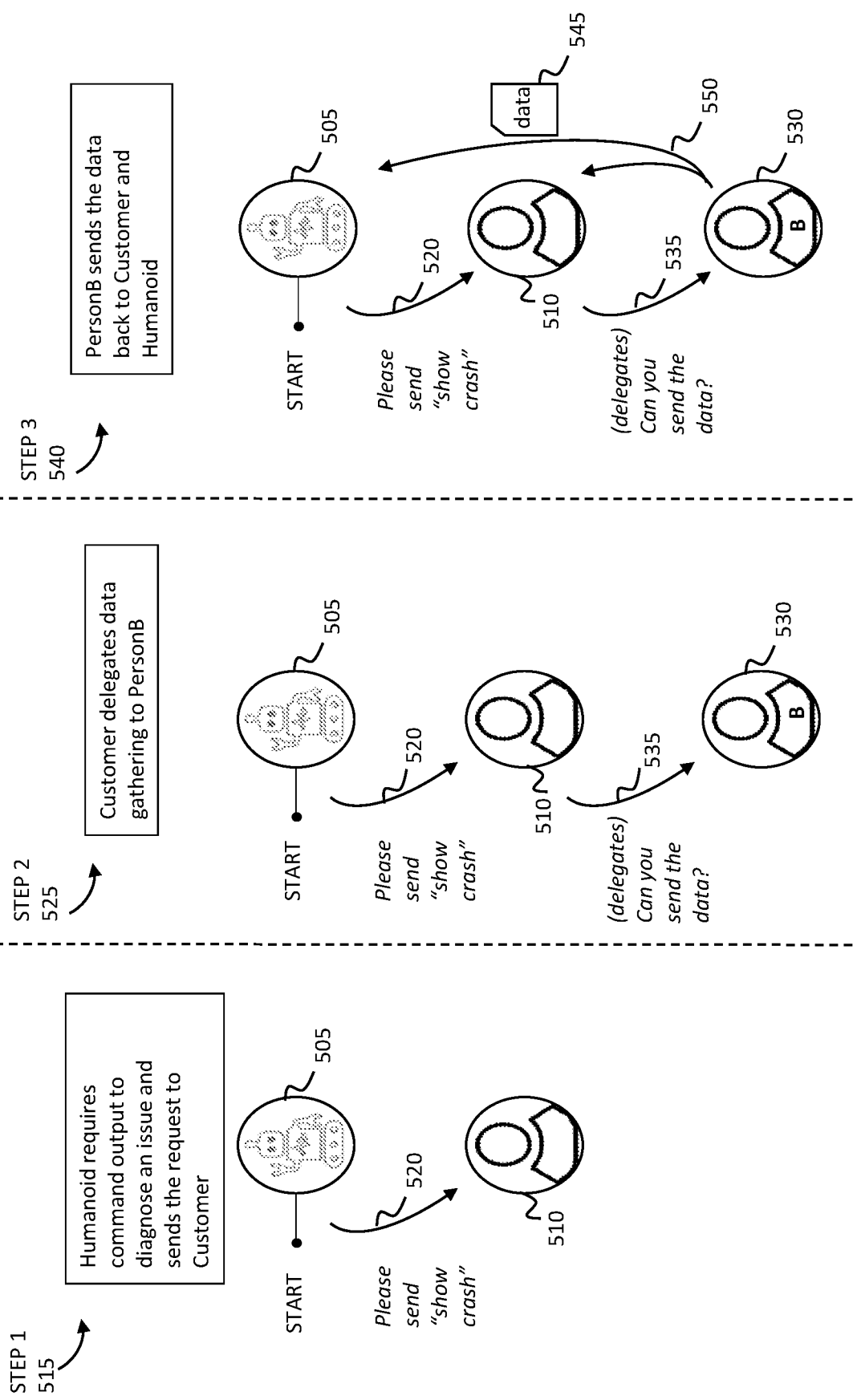
FIGS. 5A-5C are diagrams depicting an operational flow for providing automated customer support using a humanoid system, according to yet another example embodiment.
Figure 5B:
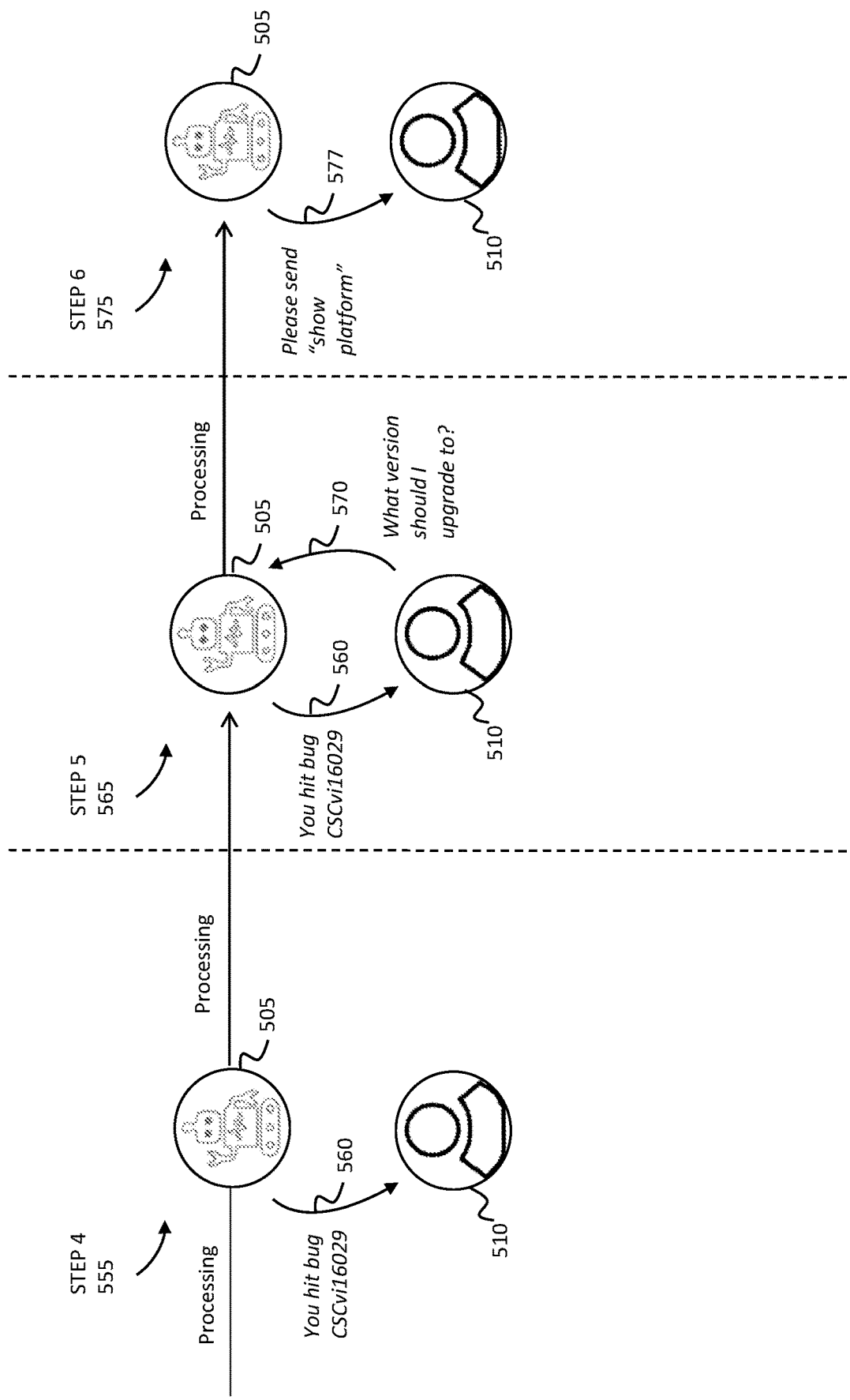
Figure 5C:
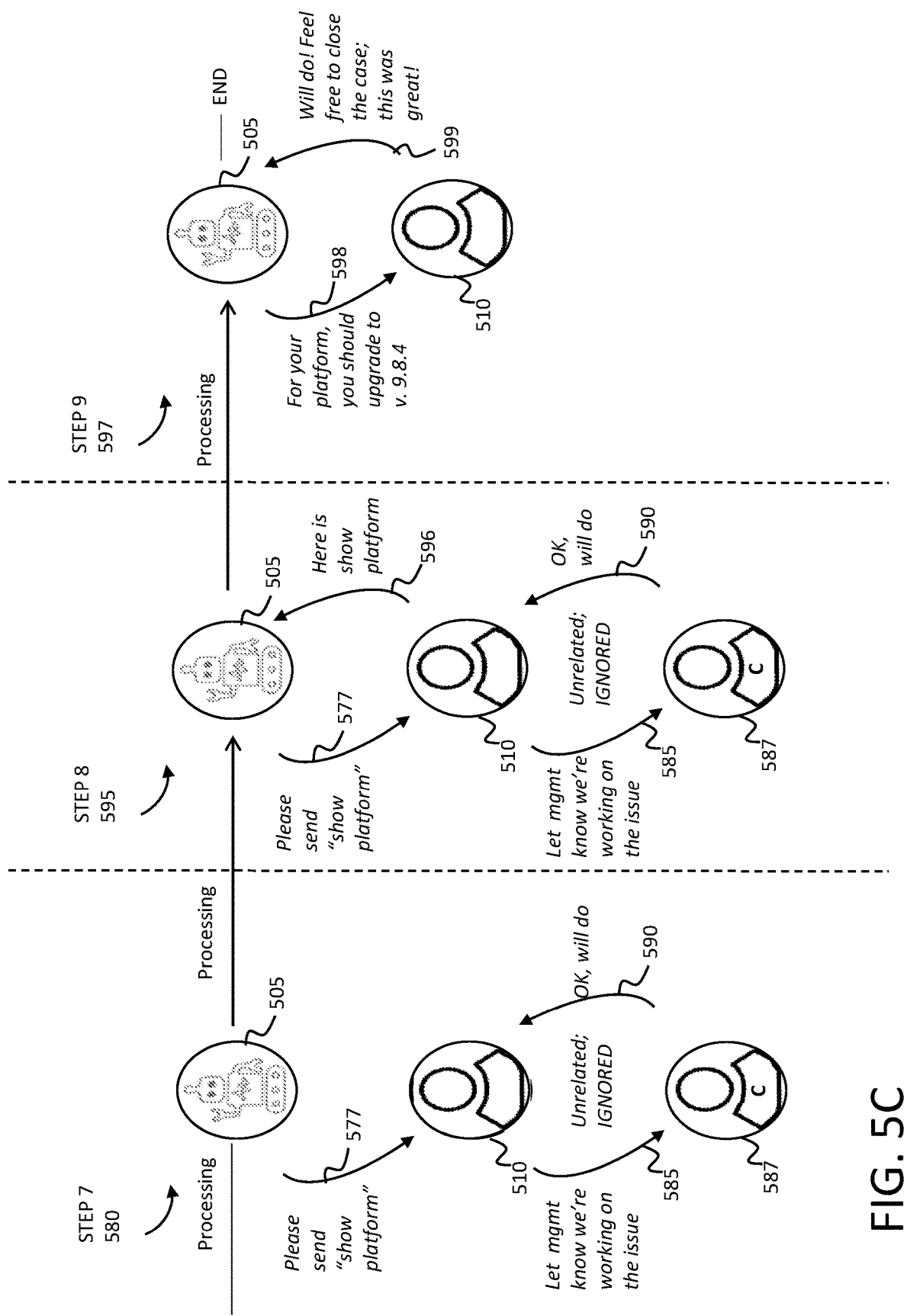

Reference is now made to FIGS. 5A-5C, which illustrate an operational flow 500 for providing automated customer support using a humanoid 505, according to another example embodiment. The flow 500 includes a series of electronic communications involving the humanoid 505. Each electronic communication takes the form of an email, instant message, text message, webpage post (e.g., in a discussion forum), chat, voice communication (e.g., involving speech, speech-to-text transcription, and/or text-to-speech transcription), or another type of communication exchanged via an electronic medium.

In the flow 500, the humanoid 505 has been provisioned for, and is, providing customer support to a customer 510. In particular, the customer 510 has experienced a computer malfunction (or "crash"), and the humanoid 505 is communicating with the customer 510 to try and resolve the crash. The communications are represented visually in FIGS. 5A-5C as a nodal graph, where each edge represents a communication stream and each node represents an endpoint.

In a first step 515 of the flow 500, the humanoid 505 sends the customer 510 an electronic communication 520, asking the customer 510 to provide information regarding the customer support needed by the customer 510. In particular, the electronic communication 520 requests that the customer 510 provide information regarding the crash, saying, "Please send 'show crash.'" In a second step 525, the customer sends a communication 535 to another person ("PersonB") 530 to obtain the requested information. For example, the communication 535 could include a message saying, "Can you send the data?", directed to PersonB 530 with a copy to (or otherwise including) the humanoid 505.

In a third step 540, PersonB 530 responds to the request by sending the customer 510 and humanoid 505 the requested data 545 in a communication 550. In a fourth step 555 (FIG. 5B), the humanoid 505 processes the data received in the communication 550 and sends the customer 510 a communication 560 with its analysis of the data. More specifically, the humanoid 505 tells the customer 510 in the communication 560 that they have encountered a known computer bug called "CSCvi16029".

Next, in a fifth step 565, the customer 510 confirms receipt of the communication 560 and asks, in a communication 570, a new question regarding a version of software to which they should upgrade. The humanoid 505 processes this new question and, in a sixth step 575 sends the customer 510 a communication 577 with a request for additional information regarding the customer's user platform. In a seventh step 580 (FIG. 5C), the customer 510 sends a communication 585 to a new person ("PersonC") 587, saying, "Let management know we're working on the issue," and PersonC 587 responds to the communication 585 with a communication 590, saying, "OK, will do." The humanoid 505 can read the communications 585 and 590 and determine to ignore and not respond to them, whether by taking action, sending a communication, or otherwise. For example, the humanoid 505 can determine not to respond to the communications 585 and 590 because the communications 585 and 590 are not directed to the humanoid 505, do not pose any questions the humanoid 505 can answer, and do not include any information requested by the humanoid 505 or otherwise resolving any open issues being addressed by the humanoid 505.

In an eighth step 595, the customer 510 responds to the humanoid 505 with the requested platform information in communication 596. In a ninth step 597, the humanoid 505 processes the platform information from the communication 596 and sends the customer 510 an answer to the open inquiry (from communication 570) regarding the software version to upgrade to, in a communication 598, saying, "For your platform, you should upgrade to v. 9.8.4." The customer 510 can send a communication 599 to acknowledge closure of the issue, e.g., by saying, "Will do! Feel free to close the case; this was great!" Upon receipt of a confirmation of closure or if no additional communications requiring action by the humanoid 505 are received within a predetermined period of time, the humanoid 505 can close the case and terminate the conversation.

Noteworthy about the communications depicted in the example of FIGS. 5A-5C is that the humanoid 505 very closely mimics the behavior of a human such that the humans involved in the communications do not realize they are dealing with a machine-based process that is simulating a human.

Turning now to FIG. 6, an example inbound communication processing operation 600 of a humanoid system is shown, according to an example embodiment. In the operation 600, the humanoid system has received a message 605 from a customer. The message 605 includes formatting and/or content—such as one or more capitalized letters, periods, or other formatting features, a header 610 with "from", "to", "cc:", and "subject" fields, and a signature 615—which does not include substantive content useful for resolving a support issue and/or is not able to be processed by a natural language processor or other communication interpretation logic of the humanoid system. In the operation 600, the humanoid system normalizes and cleanses the message 605, creating a modified message 620, which can be interpreted and used by the humanoid system to provide support to the customer.

As would be appreciated, the humanoid system can be configured to normalize and cleanse any message, regardless of whether the message is directed to the humanoid system. For example, if the humanoid system is operating in a "shadow mode" or otherwise observing communications involving another entity (e.g., one or more human operators, customers, vendors, and/or one or more entities), the humanoid system can normalize and cleanse messages in the communications to enable the humanoid system to interpret and use the information in the messages. As would be recognized by a person of ordinary skill in the art, this type of normalizing and cleaning process is illustrative and should not be construed as being limiting in any way.

FIG. 7 is a diagram depicting an outbound communication processing operation of a humanoid system, according to an example embodiment. In the operation 700, the humanoid system has sent a message 705 to a customer named "Customer" in order to advise the customer that the humanoid system is handling a support issue for the customer. The message 705 is addressed from the humanoid system, with dialogue and content akin to a communication from an actual human.

The message 705 is addressed from a name and address corresponding to the humanoid system—namely, "Humanoid"—though any name and address could be used. For example, the humanoid system could operate under one or more "real"-sounding names like "Sherlock Holmes," in order for the customer to feel (or even believe) that they are communicating directly with a human rather than a machine. The humanoid system may store content from, or related to, the message 705 in a data store (such as a case note file) for reference, oversight, and/or training purposes. As would be recognized by a person of ordinary skill in the art, the message 705 and the formatting, structure, and approach therein, are illustrative and should not be construed as being limiting in any way.

FIG. 8 is a diagram depicting a support action execution operation 800 of a humanoid system, according to an example embodiment. In the operation 800, the humanoid system has activated a plugin—the "humanoidprocessasa_crash" plugin—to process a customer's crash files and identify a bug that caused the crash. The humanoid can store logs 805 summarizing and/or cataloging each step taken in the processing. According to the logs 805, the plugin has completed its analysis and returned a result 810 indicating that the "crash is related to bug CSCvi16029." In an example embodiment, each plugin accessible to the humanoid system can be (but doesn't necessarily have to be) configured to complete analyses and operations that are more complex than analyses and operations that could ordinarily be completed by a human. As would be recognized by a person of ordinary skill in the art, the logs 805 and the formatting, structure, and approach therein, are illustrative and should not be construed as being limiting in any way.

Figure 9:
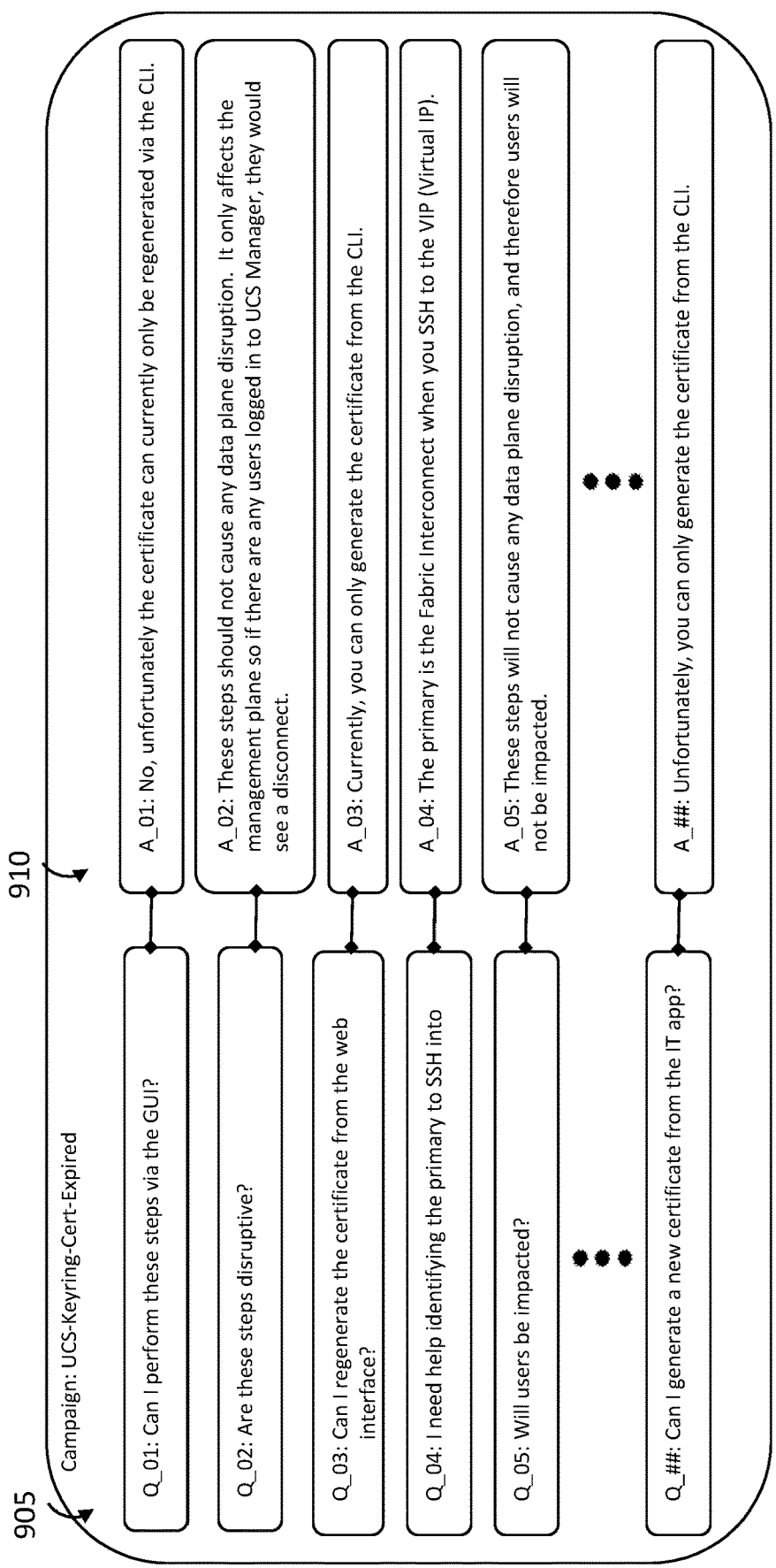
FIG. 9 is a diagram depicting a question and answer processing operation of a humanoid system, according to an example embodiment.

FIG. 9 is a diagram depicting a question and answer processing operation 900 of a humanoid system, according to an example embodiment. In the operation 900, the humanoid system has obtained a set of questions 905 and a set of answers 910 corresponding to a customer support campaign "UCS-Keyring-Cert-Expired." For example, a training module of the humanoid system may have obtained the questions 905 and answers 910 from one or more communications involving one or more entities, such as one or more customers and/or one or more human operators. The training module may have observed the communications, for example, without the humanoid system being an active participant in the communications. In addition, or in the alternative, the training module may include in the questions 905 and answers 910 any questions and answers from communications (e.g., from training operations and/or operational activities) regarding the customer support campaign involving the humanoid system.

Each of the questions and answers is indexed, with question and answer pairs being associated with one another. For example, a first question, Q_01, asking "Can I perform these steps via the GUI", is associated with a first answer, A_01, stating, "No, unfortunately the certificate can currently only be regenerated via the CLI." Note that the term "question" is used herein to refer to any input, whether worded in a question format, sentence format, or otherwise. For example, the phrase in question Q_04 "I need help identifying the primary to SSH into" can be treated as a question for purposes of the operation 900, even though it is a statement. While that particular statement elicited a response, namely, "The primary is the Fabric Interconnect when you SSH to the VIP (Virtual IP)," it is to be understood that a question may or may not elicit a response. For example, the communicating entity (e.g., the human operator) could determine that no reply or other action is required in response to a question. In that instance, the corresponding answer may be blank or may include an action or other item other than a text response.

In the example embodiment depicted in FIG. 9, the humanoid system has normalized, cleansed, or otherwise sanitized each of the questions and answers for processing purposes. For example, the humanoid system may utilize a mechanism similar to the operation 600 described above with reference to FIG. 6 to remove formatting and other non-substantive content, which is not useful for resolving a support issue and/or is not be able to be processed by a natural language processor or other communication interpretation logic of the humanoid system. The humanoid system may store the question and answer information in a data store for reference, training, analysis, and other suitable purposes. The data store may be unique to the customer service campaign or may include information for multiple customer service campaigns, with questions and answers for different customer service campaigns being distinguishable through one or more indicators.

As may be appreciated, the questions 905, answers 910, and the pairings, formatting, structure, and approach shown in FIG. 9, are illustrative and should not be construed as being limiting in any way.

Figure 10:
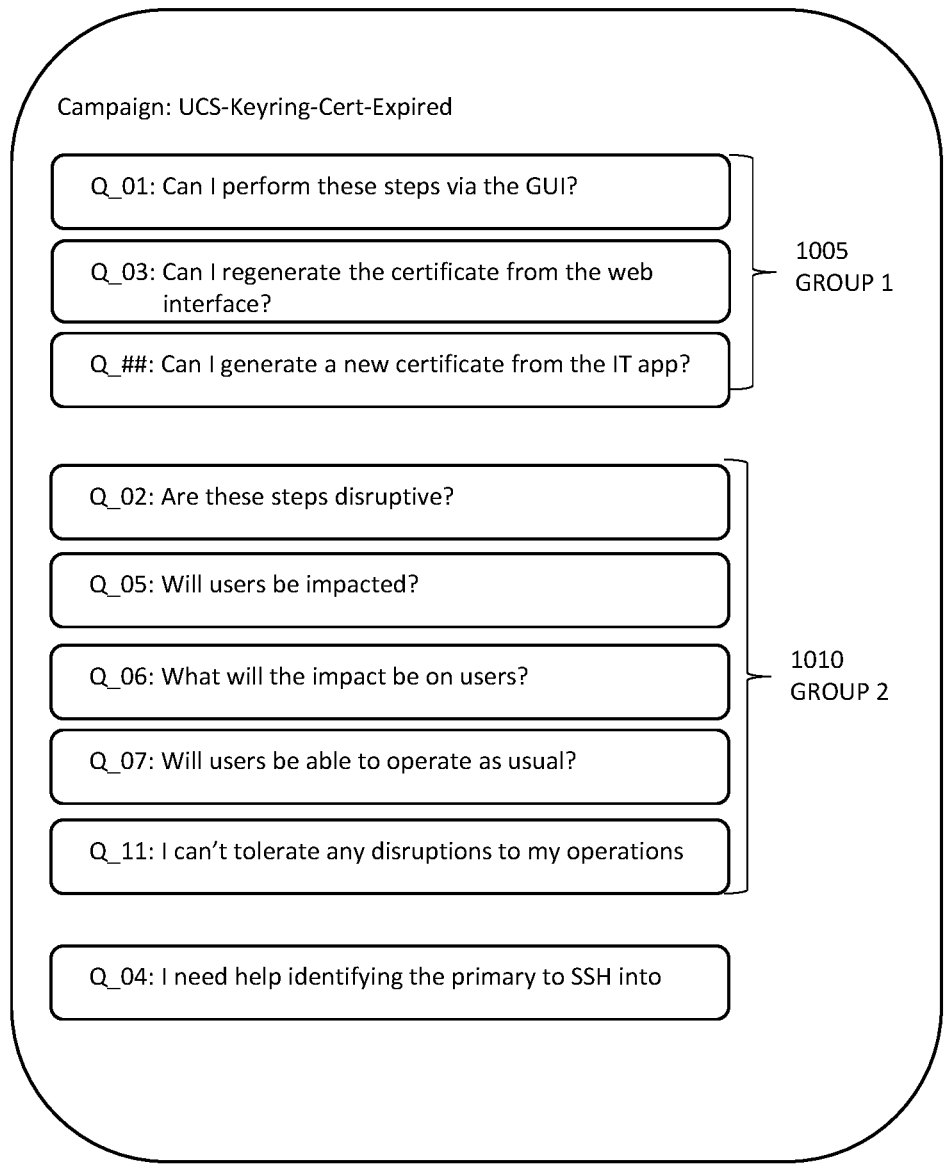
FIG. 10 is a diagram depicting a question grouping operation of a humanoid system, according to an example embodiment.

FIG. 10 is a diagram depicting a question grouping operation 1000 of a humanoid system, according to an example embodiment. In the operation 1000, the humanoid system has harvested questions (and answers), e.g., as described above in connection with the operation 900 depicted in FIG. 9, and has processed the questions to group together questions for a customer service campaign that are substantively the "same" question but asked in different ways. For example, upon harvesting/obtaining a question, a training module of the humanoid system can query existing questions in a data store for, or associated with, the customer service campaign, to determine respective similarity ratings. For example, when a similarity rating for two particular questions exceeds a predetermined threshold (e.g., a similarity rating of 85% or higher, though the threshold could be above 85% or below 85%), the questions may be considered to be the same. In addition, or in the alternative, the training module can compute a similarity rating for answers associated with the questions (e.g., in question-answer pairings such as the pairings described above in connection with FIG. 9). For example, when a similarity rating for the answers exceeds a predetermined threshold (e.g., a similarity rating of 85% or higher, though the threshold could be above 85% or below 85%), the answers may be considered to be the same—and therefore the question and answer pairs may be considered to be the same.

The humanoid system can group the similar questions together to form one or more question groups. For example, in the embodiment depicted in FIG. 10, the humanoid system has grouped three questions, namely question Q_01, question Q_03, and question Q_##, together into a first group 1005, and the humanoid system has grouped five questions, namely question Q_02, question Q_05, question Q_06, question Q_07, and question Q_11, together into a second group 1010. Another question, Q_04 is not similar to any other known questions and is, therefore, stored in its own "group" outside of the first group 1005 and the second group 1010. Over time, as the humanoid system harvests additional questions, the questions may be added to one or more existing groups or included in a newly created group, as appropriate.

The humanoid system may group the questions together via any mechanism now known or hereinafter developed. For example, the humanoid system may associate grouped questions (and/or answers associated with the questions) with one another in one or more data stores using one or more flags, indicators, database keys, or other mechanisms. As may be appreciated, the question groupings, formatting, structure, and approach shown in FIG. 10, are illustrative and should not be construed as being limiting in any way.

In an example embodiment, the humanoid system is configured to select a "best" answer for each of the groupings. For example, for each group of questions, the training module of the humanoid system can compare the answers corresponding to the questions to select one of the answers as the "best" answer. The training module may consider any of a variety of different factors to select the best answer. For example, the training module may consider whether and to what degree each answer identifies specific variables, a forward modeling, a linguistic analysis, and/or a time of resolution for the support case corresponding to the answer. The specific variables can include information related to the support issue or customer support campaign, like filenames, error messages, customer names, etc. For example, a particular answer that includes a variable that is not "common" across other answers in the grouping may be deemed less useful, while a particular answer that includes a variable that appears in other answers in the grouping may be deemed more useful.

A forward modeling can include, for example, a next response from a customer after a particular answer is provided. If that response includes a confirmation (such as "Thanks, that fixed my issue), then the answer may be considered more useful. Similarly, if the next response from the customer includes a follow-up question, then the answer may be considered less useful. A linguistic analysis may involve determining the readability and sentence structure of the answer. For example, a higher rating from a linguistic analysis may increase the value of an answer as compared to an answer with a lower rating from a linguistic analysis. In addition, a particular answer given in a support case with a quicker time of resolution may be favored over another answer given in a support case with a slower time of resolution. As would be appreciated, these factors are illustrative and should not be construed as being limiting in any way.

In an example embodiment, the training module is configured to select the best answer only after a group includes at least a threshold number of questions (and answers). For example, the training module may forego this analysis until after the group includes at least five questions (and answers), though the threshold may be higher than five or less than five, or there may be no threshold, in alternative example embodiments. Moreover, the training module may change the selected best answer for a particular grouping dynamically as additional questions (and answers) are harvested and/or based on training and/or other input for the humanoid system.

The training module is configured to store information regarding its selection of an answer as a "best" answer via any mechanism now known or hereinafter developed. For example, the training module may add, remove, change, or update a flag, setting, and/or other feature associated with the humanoid system, e.g., in one or more databases or other structures, to identify the best answer for each grouping. For example, the selected best answer may be used to determine and/or confirm a confidence level of the humanoid system to handle support cases related to the question, as described in more detail below.

Figure 11:
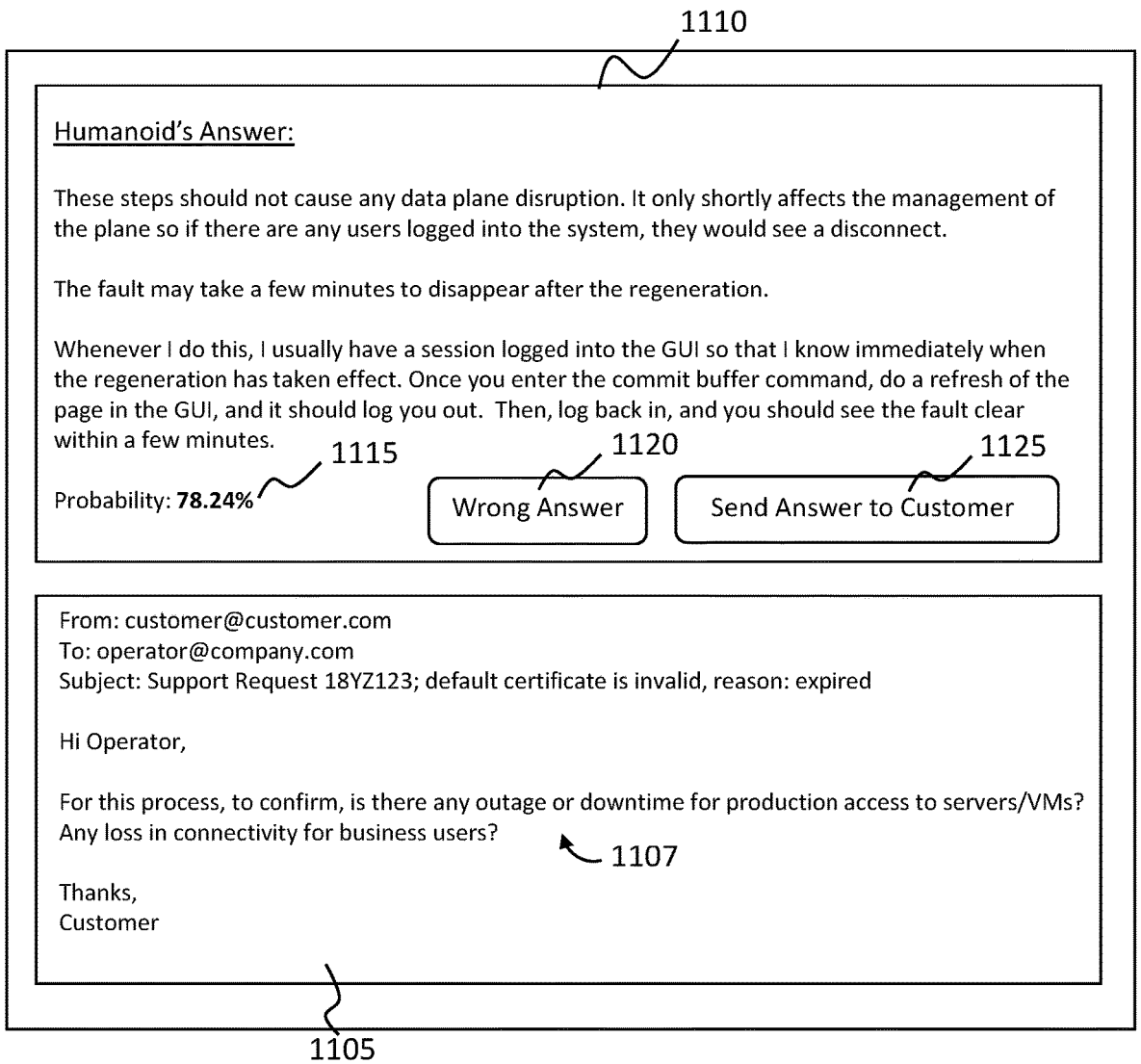
FIG. 11 is an example screenshot of a user interface displayed in connection with a training operation of a humanoid system, according to an example embodiment.

FIG. 11 is an example screenshot of a user interface 1100 displayed in connection with a training operation of a humanoid system, according to an example embodiment. For example, a training module of the humanoid system can cause the user interface 1100 to be displayed to a human operator when the human operator is handling a customer support case for which the humanoid system is operating in a "shadow mode." The user interface 1100 includes a communication 1105 addressed from a customer named "Customer" to a human operator named "Operator," related to a support request "18YZ123."

The communication 1105 includes a question 1107: "For this process, to confirm is there any outage or downtime for production access to servers/VMs? Any loss of connectivity for business users?" The training module of the humanoid system observes this communication 1105 and processes the question 1107 to determine whether the question 1107 is the same as a known question for a customer support campaign corresponding to the communication. For example, this process can involve the training module sanitizing and comparing the question 1107 to known questions as described above with reference to FIGS. 6-10.

The training module of the humanoid system can determine whether it knows an answer to the question 1107 and, if so, it can display the answer for the human operator's consideration. For example, using one or more machine learning models or other logic, the training module can determine whether it has an answer with a confidence level above a predetermined threshold (e.g., a confidence score greater than or equal to 80%, though the threshold could be greater than 80% or lower than 80%). The answer may include, for example, a "best" answer selected for a group of questions similar to the question 1107, as described above.

In the example user interface 1100, the training module has determined that it knows an answer 1110 to the question 1107 and has caused the answer 1110 to be displayed along with a confidence score 1115 for the answer 1110. For example, the training module can calculate the confidence score using one or more machine learning models or other probabilistic data or information. The human operator can view the proposed answer 1110 and take action to either reject the proposed answer by activating a "Wrong Answer" input 1120 or accept the proposed answer by activating a "Send Answer to Customer" input 1125. For example, activating the "Wrong Answer" input 1120 could enable the human operator to enter an alternative (more correct) answer for the customer, while activating the "Send Answer to Customer" input 1125 could cause the humanoid system's answer to be sent to the customer, either immediately or after the human operator has an opportunity to make edits to the answer. For example, activating the "Send Answer to Customer" input 1125 could cause the training module (or another module or system internal or external to the humanoid system) to create an editable email from the human operator to the customer, with a body of the email being prepopulated with the answer 1110. Notably, the answer 1110 is related as though the human operator was the author, from the human operator's address, in a natural human voice/diction.

The human operator's behavior in response to the proposed answer 1110 may provide a feedback loop for dynamically training, and/or adjusting one or more confidence levels of, the humanoid system. For example, if the human operator uses the proposed answer 1110 verbatim, a confidence level of the humanoid system (and/or one or more machine learning models used by the humanoid system), including, e.g., the confidence score 1115, may be increased, whereas, if the human operator does not accept the proposed answer 1110, or materially alters the proposed answer 1110 in its response to the customer, logic of the humanoid system (e.g., in the machine learning models or one or more of the modules of the humanoid system) may be refined to reflect that decision, and a confidence level of the humanoid system (and/or the machine learning models), may be decreased. For example, if the human operator provides the customer with an answer other than the proposed answer 1110, the training module may learn the new answer, apply a (potentially positive) weighting to the new answer, and adjust (e.g., lower) the confidence score 1115 to the proposed answer 1110.

As would be recognized by a person of ordinary skill in the art, the user interface 1100 and the formatting, structure, and approach depicted therein, are illustrative and should not be construed as being limiting in any way. For example, in an alternative embodiment, the user interface 1100 could take another form and/or the proposed answer 1110 could be provided via a different mechanism, e.g., via an email, instant message, text message, webpage post chat, voice communication, or other communication.

Figure 12:
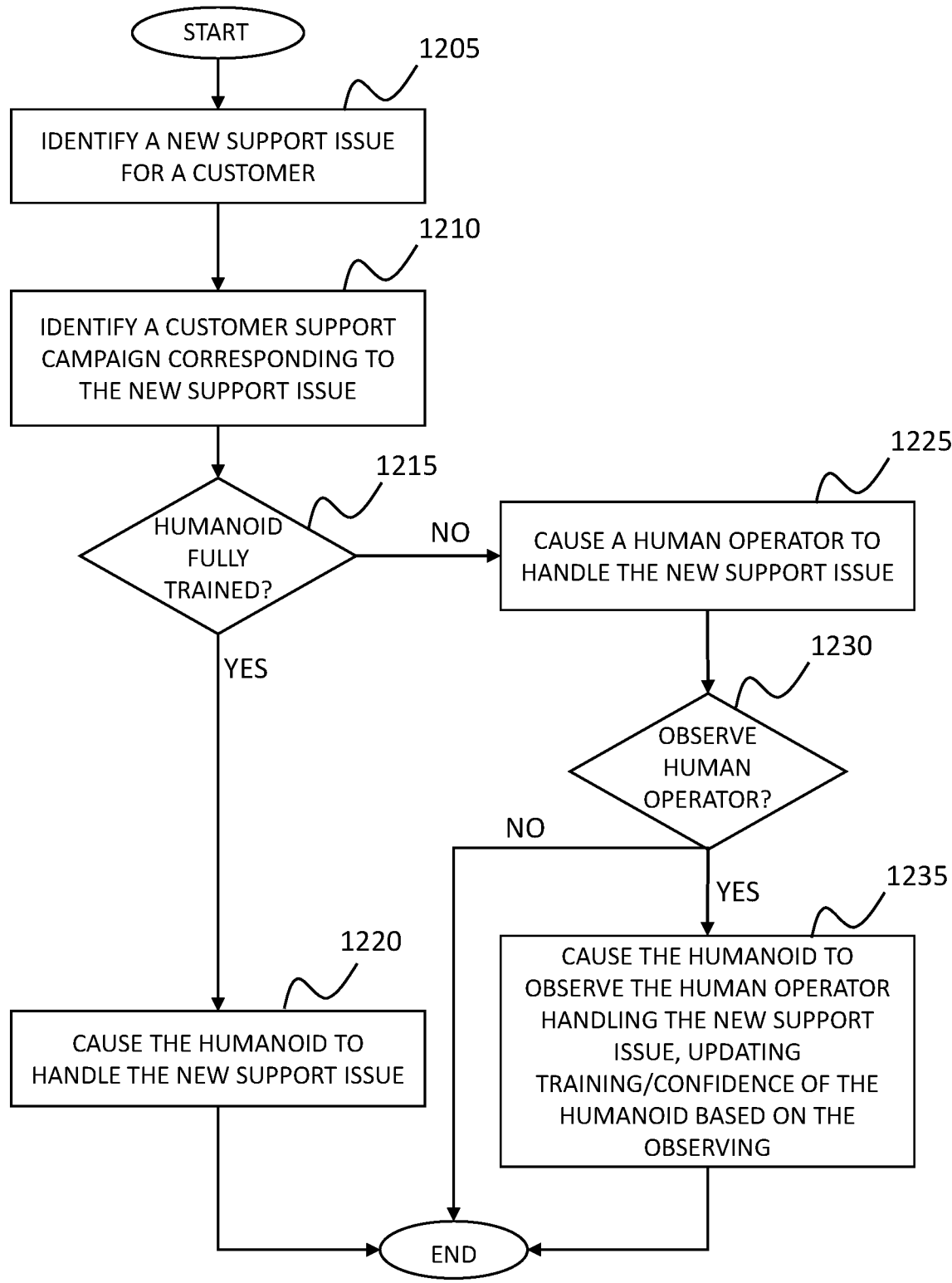
FIG. 12 is a flow chart of a method for providing automated customer support using a humanoid system, according to an example embodiment.

FIG. 12 is a flow chart of a method 1200 for providing automated customer support using a humanoid system, according to an example embodiment. In step 1205, a humanoid system identifies a new support issue for a customer. For example, a case assessment module of the humanoid system can identify the support issue by receiving an incoming support request for the customer or proactively detecting a problem or other matter potentially of interest to the customer. The support issue can include any technical, product, service, or other issue to be addressed for, or on behalf of, the customer.

In step 1210, the humanoid system identifies a customer support campaign corresponding to the new support issue. For example, the case assessment module can identify the customer support campaign by cooperating with a communications module and/or one or more other modules of the humanoid system to compare information regarding the new support issue with information regarding the customer support campaigns. This process may involve, for example, cleansing, normalizing, and/or otherwise sanitizing one or more messages or other information corresponding to the new support issue to enable the case assessment module to interpret and evaluate the new support issue. For example, the case assessment module may review a title or problem description field of any support request and/or any attached log files, e.g., using one or more regex matching rules and/or machine learning logic, to determine whether the support issue corresponds to an existing customer support campaign and, if so, to identify the corresponding, existing customer support campaign.

In step 1215, the humanoid system determines whether the humanoid system is fully trained to handle the new support issue. For example, this determination can involve the case assessment module determining whether the humanoid system (and/or any machine learning models in or associated with the humanoid system) has been fully trained or otherwise configured to handle support issues for the customer support campaign. For example, the case assessment module may determine that the humanoid system has been fully trained or otherwise configured to handle support issues for the customer support campaign if the humanoid system has been provisioned for handling customer support cases for the customer support campaign. In an example embodiment, the case assessment module can determine whether the humanoid system is capable of handling the support issue by referencing information stored in one or more databases internal to the humanoid system or external to the humanoid system. For example, the database(s) can store an indication (e.g., a flag, setting, and/or other feature) for each customer support campaign, each machine learning model, and/or each particular support issue, as applicable, whether the humanoid system is fully trained and provisioned.

If the case assessment module determines in step 1215 that the humanoid system is fully trained to handle the new support issue, then the method 1200 continues to step 1220 where the case assessment module causes the humanoid system to handle the new support issue. For example, the case assessment module can cause the humanoid system to complete all actions, and participate in all communications with the customer, for resolving the support issue, without the human operator communicating with the customer. If the case assessment module determines in step 1215 that the humanoid system is not fully trained to handle the new support issue, e.g., because the humanoid system has not been provisioned for the customer support campaign or is otherwise not configured to handle the support issue, the method 1200 continues to step 1225 where the case assessment module causes the human operator (or another resource other than the humanoid system) to handle the new support issue.

In step 1230, the humanoid system determines whether to observe the human operator handling the new support issue, e.g., in a "shadow mode." For example, a training module of the human operator can determine whether self-learning through observation of the human operator would be beneficial for increasing a knowledge and/or confidence of the humanoid system. This determination may involve consideration, for example, of whether the new support issue is similar to a known support issue for which the humanoid system already has some information, e.g., whether the new support issue involves one or more questions that are similar to one or more questions known to the humanoid system. For example, the new support issue may be similar to known support issues for which the humanoid system has an incomplete data set and/or a confidence level below a predetermined threshold. Through observation, the humanoid system may be able to further develop the data set and/or increase the confidence level to enable the humanoid system to handle future, similar support cases.

As may be appreciated, these considerations are illustrative and additional, fewer, or different considerations may be included in alternative example embodiments. For example, the training module may elect to observe all or no support issues during a certain timeframe, for certain customers or types or instances of customers or customer support issues, or otherwise. If the training module determines in step 1230 to observe the human operator handling the new support issue, then the method 1200 continues to step 1235 where the training module causes the observation to be performed.

Figure 13:
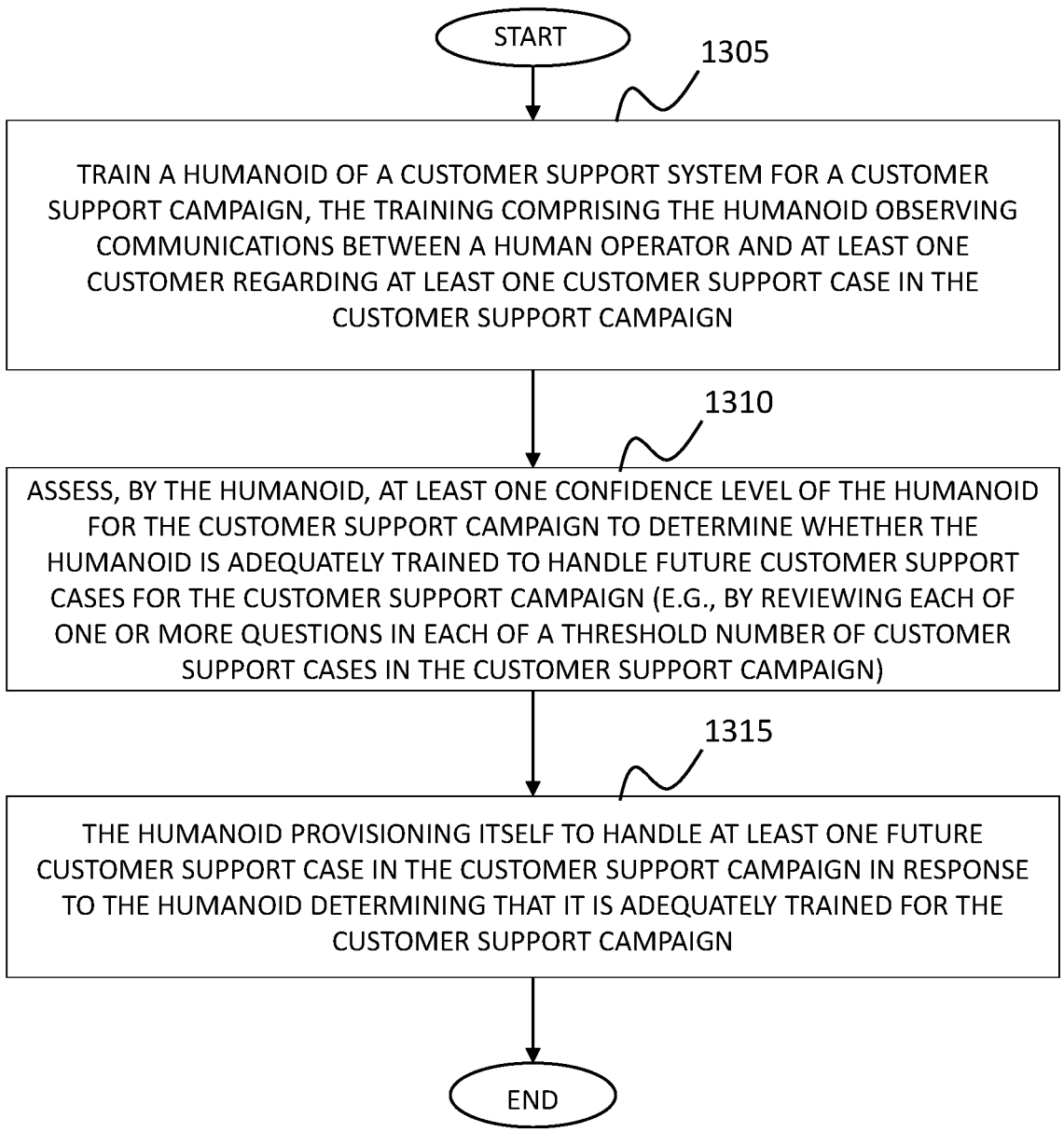
FIG. 13 is a flow chart of a method for self-provisioning by a humanoid system to provide automated customer support, according to an example embodiment.

FIG. 13 is a flow chart of a method 1300 for self-provisioning by a humanoid to provide automated customer support, according to an example embodiment. In step 1305, the humanoid is trained for a customer support campaign. The training includes the humanoid observing communications between a human operator and at least one customer regarding at least one customer support case in the customer support campaign. For example, a training module of the humanoid can cooperate with a communications module of the humanoid to process questions and answers from the communications for building a knowledge base with which the humanoid may potentially handle future cases itself, i.e., without the human operator communicating with the customer. This processing may involve, e.g., harvesting questions and answers from the communications, grouping similar questions, and analyzing the answers to determine a best answer for each grouping. An example method for training the humanoid through observation is described in more detail below with reference to FIG. 14.

In step 1310, the humanoid assesses at least one confidence level of the humanoid for the customer support campaign to determine whether the humanoid is adequately trained to handle future customer support cases for the customer support campaign. The confidence level can include any probability, percentage, number, or other value, which may be measured. For example, the humanoid can review each of one or more questions in each of a threshold number of cases in the customer support campaign to see whether the humanoid has answers with confidence levels greater than a threshold amount for at least a threshold amount of questions in at least a threshold amount of cases. As may be appreciated, the numbers and types of considerations involved in this self-assessment (e.g., the numbers and types of confidence levels and thresholds) may vary. For example, higher confidence levels and/or threshold amounts may be desirable for complex customer support campaigns, while lower confidence and/or threshold amounts may be adequate for simple customer support campaigns. Example methods for assessing the ability of the humanoid to provide automated customer support for a customer support campaign are described in more detail below with reference to FIGS. 15 and 16.

In step 1315, the humanoid provisions itself to handle at least one future customer support case in the customer support campaign in response to the humanoid determining that it is adequately trained for the customer support campaign. The provisioning involves activating the humanoid, or a feature or function associated with the humanoid, to enable automatic handling by the humanoid of future support cases as appropriate. For example, provisioning may involve adding, removing, changing, or updating a flag, setting, and/or other feature associated with the humanoid, e.g., in a database or other structure.

As may be appreciated, there may be multiple different options for provisioning the humanoid. For example, the humanoid can auto-enable itself to handle 100% of all future support cases for the customer support campaign. Alternatively, the humanoid can auto-enable itself to handle only an initial subset percentage of cases and monitor/confirm performance metrics (like customer satisfaction scores) before ramping up to handling a greater percentage (or all) of the future support cases. This can, e.g., allow the humanoid to "ease into" the handling of the support cases for the customer support campaign. In addition, or in the alternative, the humanoid can announce to a system administrator that it is sufficiently trained and allow the system administrator to decide whether and at what volume to engage the humanoid for the future support cases. For example, the humanoid can announce its ability to the system administrator by adding, removing, changing, or updating a flag, setting, and/or other feature associated with the humanoid, and/or by sending a communication (such as an email, instant message, text message, webpage post (e.g., in a discussion forum), chat, voice communication (e.g., involving speech, speech-to-text transcription, and/or text-to-speech transcription), or another type of communication) to the system administrator.

Figure 14:
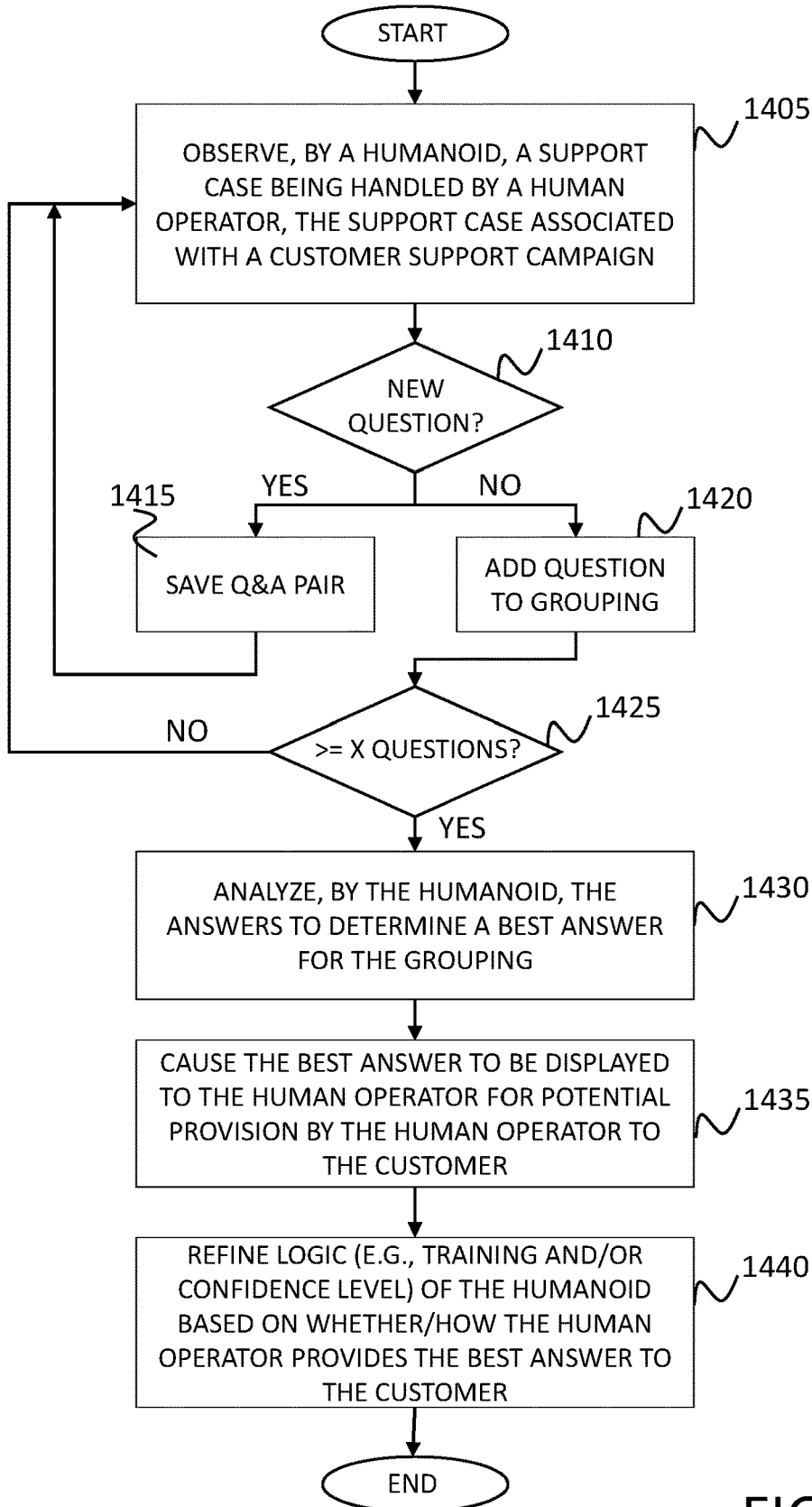
FIG. 14 is a flow chart of a method for training a humanoid system to provide automated customer support, according to an example embodiment.

FIG. 14 is a flow chart of a method 1400 for training a humanoid system to provide automated customer support, according to an example embodiment. In step 1405, the humanoid observes a support case being handled by a human operator. The support case is associated with a customer support campaign. For example, a training module of the humanoid can cooperate with a communications module of the humanoid to observe communications between the human operator and at least one customer regarding the customer support case.

In step 1410, the humanoid determines whether a question in the communications is a new question, i.e., whether the question is the "same" as a question already known for the customer support campaign. For example, the training module, in cooperation with the communications module, can extract the question (and any answers) from the communications and compare the question to other questions that were asked previously to see if the questions are essentially asking the same thing in different ways. For example, a first question asking "are these steps disruptive?" may be considered the same as a second question asking "will users be impacted?" The humanoid may perform this comparison, for example, using one or more machine learning or other algorithms to calculate a similarity rating; when the similarity rating for two particular questions exceeds a predetermined threshold, threshold (e.g., a similarity rating of 85% or higher, though the threshold could be above 85% or below 85%), the questions may be considered to be the same. In addition, or in the alternative, the training module can compute a similarity rating for answers associated with the questions (e.g., in question-answer pairings such as the pairings described above in connection with FIG. 9). For example, when a similarity rating for the answers exceeds a predetermined threshold (e.g., a similarity rating of 85% or higher, though the threshold could be above 85% or below 85%), the answers may be considered to be the same—and therefore the question and answer pairs may be considered to be the same.

If the humanoid determines in step 1410 that the question is a new question, then the method 1400 continues to step 1415 where the humanoid stores the new question and any corresponding answer for future reference, e.g., in a "holding bin." The method 1400 then continues to step 1405 where the humanoid continues to observe the support case. For example, the humanoid may continue to harvest any additional questions or answers from the support case (or from one or more other support cases) to further build its knowledge base. This may involve, e.g., identifying any future, additional questions (and corresponding answers) that are similar to the new question—which may then be analyzed as a group, per the process described below.

If the humanoid determines in step 1410 that the question is not a new question, i.e., that the question is the "same" as one or more known questions for the customer support campaign, the method 1400 continues to step 1420. In step 1420, the humanoid adds the new question to a grouping with the known question(s) that are the same as the new question. This may involve, for example, adding the question an existing grouping of two or more known questions or creating a grouping by associating the new question with a known question. The humanoid may group the questions together via any mechanism now known or hereinafter developed. For example, the humanoid may associate grouped questions (and/or answers associated with the questions) with one another in one or more data stores using one or more flags, indicators, database keys, or other mechanisms.

In step 1425, the humanoid determines whether the grouping includes at least a threshold number of (similar/matching) questions. For example, the humanoid can determine whether the grouping includes at least five questions, though the threshold may be higher than five or less than five, or there may be no threshold, in alternative example embodiments. If the humanoid determines in step 1425 that the grouping doesn't include at least the threshold number of questions, then the method 1400 continues to step 1405 where the humanoid continues to observe the support case. For example, the humanoid may continue to harvest any additional questions or answers from the support case (or from one or more other support cases) to further build its knowledge base.

If the humanoid determines in step 1425 that the grouping includes at least the threshold number of questions, then the method 1400 continues to step 1430 where the humanoid analyzes the answers for the questions in the grouping to determine a best answer for the grouping. The humanoid may consider any of a variety of different factors to select the best answer. For example, the humanoid may consider whether and to what degree each answer identifies specific variables, a forward modeling, a linguistic analysis, and/or a time of resolution for the support case corresponding to the answer. The specific variables can include information related to the support issue or customer support campaign, like filenames, error messages, customer names, etc. For example, a particular answer that includes a variable that is not "common" across other answers in the grouping may be deemed less useful, while a particular answer that includes a variable that appears in other answers in the grouping may be deemed more useful.

A forward modeling can include, for example, a next response from a customer after a particular answer is provided. If that response includes a confirmation (such as "Thanks, that fixed my issue), then the answer may be considered more useful. Similarly, if the next response from the customer includes a follow-up question, then the answer may be considered less useful. A linguistic analysis may involve determining the readability and sentence structure of the answer. For example, a higher rating from a linguistic analysis may increase the value of an answer as compared to an answer with a lower rating from a linguistic analysis. In addition, a particular answer given in a support case with a quicker time of resolution may be favored over another answer given in a support case with a slower time of resolution. As would be appreciated, these factors are illustrative and should not be construed as being limiting in any way.

In step 1435, the humanoid causes the best answer to be displayed to the human operator for potential provision by the human operator to the customer. For example, the humanoid may provide the proposed answer to the human operator only if the humanoid determines that the proposed answer has a confidence score above a predetermined threshold. The display may include one or more inputs, which the human operator may selectively activate to accept or reject the proposed answer. For example, the human operator may activate an input to cause the proposed answer (either verbatim or edited) to be automatically included in a communication from the human operator to the customer.

In step 1440, the logic of the humanoid is refined based on whether/how the human operator provides the answer proposed by the humanoid to the customer. For example, if the human operator uses the proposed answer provided by the humanoid verbatim, a confidence level of the humanoid (and/or one or more machine learning models used by the humanoid) may be increased, whereas, if the human operator does not use the proposed answer provided by the humanoid or materially alters the proposed answer provided by the humanoid, logic of the humanoid (e.g., in the one or more machine learning models) may be refined to reflect that decision, and a confidence level of the humanoid (and/or the one or more machine learning models) may be decreased. Thus, the human operator's behavior in response to the proposed answer may provide a feedback loop for dynamically training, and/or adjusting one or more confidence levels of, the humanoid.

Figure 15:
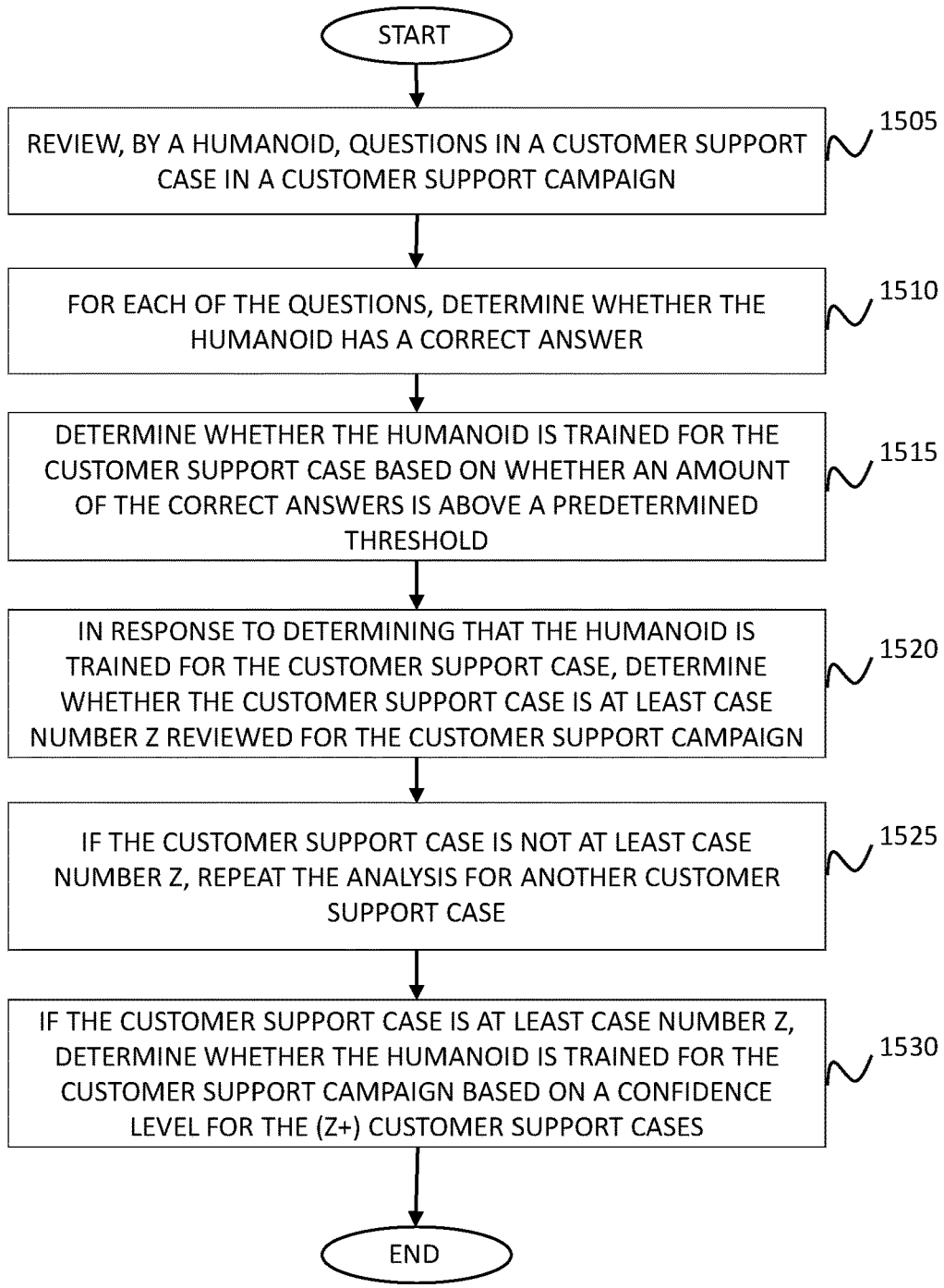
FIG. 15 is a flow chart of a method for assessing the ability of a humanoid system to provide automated customer support for a customer support campaign, according to an example embodiment.

FIG. 15 is a flow chart of a method 1500 for assessing the ability of a humanoid to provide automated customer support for a customer support campaign, according to an example embodiment. In step 1505, a training module of the humanoid reviews each question of a set of questions in a customer support case in a customer support campaign. For each question, the training module determines in step 1510 whether the humanoid knows a correct answer for the question. For example, this determination may involve the training module determining whether a confidence level for the answer is greater than a predetermined threshold X (e.g., 80%, though the threshold could be another value above 80% or below 80%). In an example embodiment, the confidence level may (but does not necessarily have to) reflect feedback or other information from a human operator.

In step 1515, the training module determines whether the humanoid is trained for the customer support case based on whether an amount of the correct answers is above a predetermined threshold Y. For example, if the training module knows the correct answer (e.g., an answer with a confidence level above the predetermined threshold X) for at least a threshold percentage of questions (e.g., 85% of the questions, though the threshold could be another value above 85% or below 85%), for at least a threshold number of questions (e.g., five questions, though the number of questions could be above five or below five or the threshold could be omitted in alternative example embodiments) in a support case, the training module can determine that the humanoid is trained for the customer support case.

In response to determining in step 1515 that the humanoid is trained for the customer support case, the training module determines in step 1520 whether the customer support case being reviewed is at least case number Z reviewed for the customer support campaign, i.e., that at least a threshold Z number of customer support cases have been reviewed for the customer support campaign. For example, the training module can consider a lookback window of recent cases to review at least fifty (or another number above or below fifty) customer support cases in the customer support campaign. This can, e.g., ensure that at least a minimum representative amount of customer support case data is available to enable the training module to make an informed decision regarding a readiness of the humanoid with respect to the overall customer support campaign.

If the customer support case is not at least case number Z, then, in step 1525, the training module repeats the analysis for another customer support case. If the training module determines in step 1520 that the customer support case is at least case number Z, then the training module determines in step 1530 whether the humanoid is trained for the customer support campaign (i.e., whether the humanoid is adequately trained to handle future customer support cases for the customer support campaign) based on a confidence level for the (Z+) customer support cases. For example, the training module may determine that the humanoid is trained for the customer support campaign if the humanoid is trained for at least a threshold amount of the (Z+) customer support cases (e.g., 80% of the support cases, though the threshold could be above 80% or below 80%). This determination may, e.g., cause the humanoid to self-provision itself for handling the future support cases as described in more detail above.

As may be appreciated, the numbers and types of considerations involved in the analysis presented in FIG. 15 (e.g., the numbers and types of confidence levels and thresholds) may vary in alternative example embodiments. For example, higher confidence levels and/or threshold amounts may be desirable for complex customer support campaigns, while lower confidence and/or threshold amounts may be adequate for simple customer support campaigns. Moreover, it should be understood that, in various different embodiments, the training module of the humanoid system can review all or a subset of the questions involved in one or more of the customer support cases at a same time or the training module can review the questions and/or support cases in a sequential order, with a review for a first (e.g., a current or most recent) question or customer support case informing whether and/or how to complete a review of a second question or customer support case.

Figure 16:
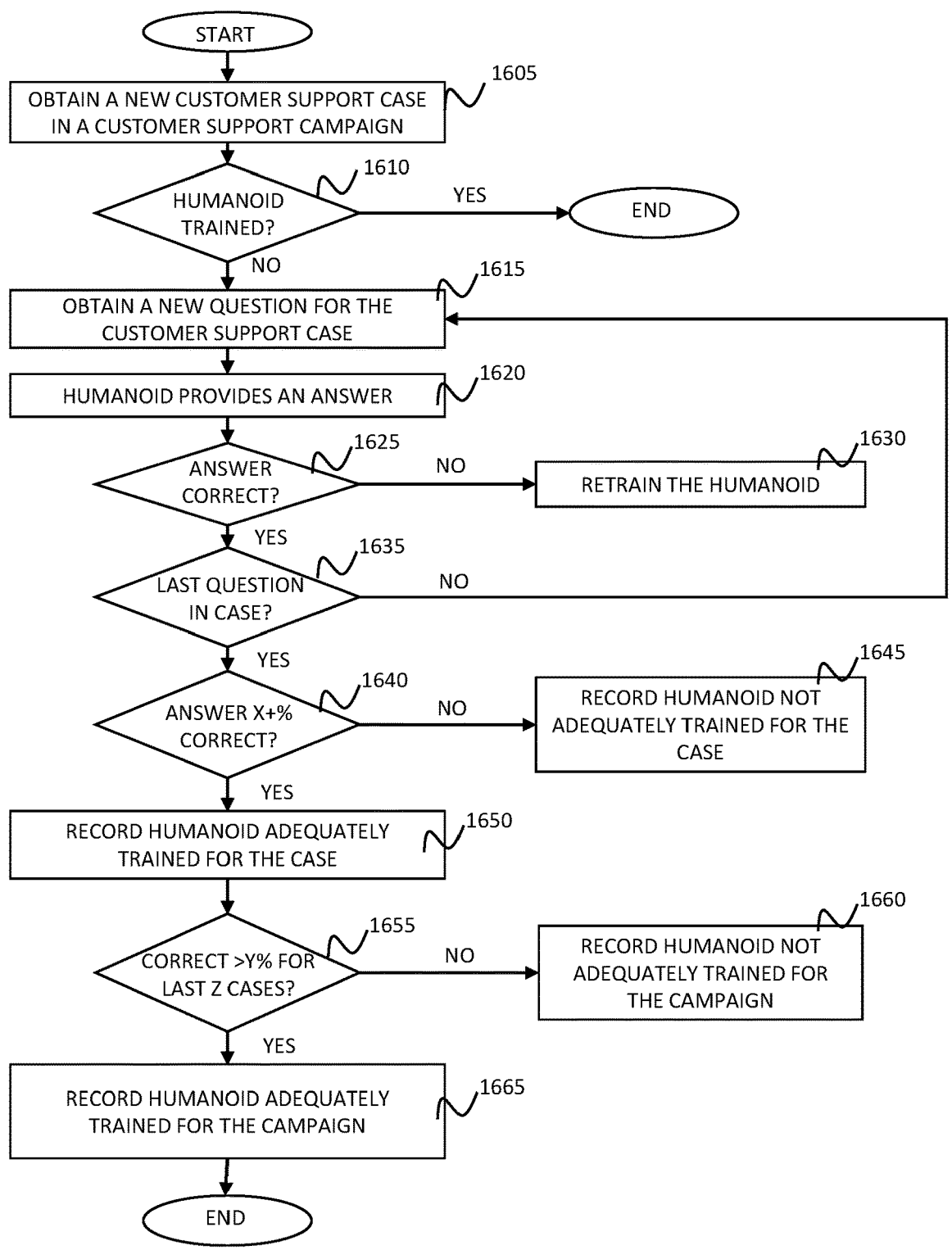
FIG. 16 is a flow chart of a method for assessing the ability of a humanoid system to provide automated customer support for a customer support campaign, according to another example embodiment.

FIG. 16 is a flow chart of a method 1600 for assessing the ability of a humanoid to provide automated customer support for a customer support campaign, according to another example embodiment. In step 1605, a case assessment module of the humanoid obtains a new customer support case in a customer support campaign. In step 1610, the case assessment module determines whether the humanoid is adequately trained to handle the customer support case. For example, the case assessment module may determine that the humanoid is adequately trained if the humanoid has been provisioned for handling customer support cases for the customer support campaign. If the case assessment module determines in step 1610 that the humanoid is adequately trained, then the method 1600 ends. For example, the case assessment module may (but does not necessarily have to) assign the new customer support case to the humanoid in response to determining that the humanoid is adequately trained.

If the case assessment module determines in step 1610 that the humanoid is not adequately trained, then the method 1600 continues to step 1615. In step 1615, a training module of the humanoid obtains a new question for the customer support case. For example, the training module can read and/or harvest the new question from one or more communications involving the customer and/or a human operator assisting the customer with the customer support case. In step 1620, the humanoid provides an answer to the question. For example, the training module of the humanoid may determine an answer to the question using machine learning and/or other logic, based on its current knowledge base of information related to the customer support campaign and/or customer support case. In this context, "providing" the answer may involve the humanoid simply determining the answer or it may involve the humanoid supplying the answer to a human operator or other entity for consideration/review.

In step 1625, the training module determines whether the answer provided in step 1620 is correct. For example, the training module may determine that the answer is correct if a confidence level for the answer is greater than a predetermined threshold (e.g., 80%, though the threshold could be another value above 80% or below 80%). If the training module determines in step 1625 that the answer is not correct, then the method 1600 continues to step 1630 where the humanoid is retrained. For example, machine learning or other logic associated with the humanoid may be refined to reflect the fact that the provided answer was incorrect and/or the humanoid may continue to collect information through self-learning, reinforced learning, supervised learning, and/or other techniques to develop its proficiency with respect to the customer support case and/or customer support campaign.

If the training module determines in step 1625 that the answer is correct, then the method 1600 continues to step 1635 where the training module determines whether the question is a last question in the customer support case, i.e., whether all questions for the customer support case have been reviewed/considered by the humanoid. If the training module determines that the question is not the last question in the customer support case, then the method 1600 continues to step 1615 where the training module obtains another question for consideration.

If the training module determines in step 1635 that the question is the last question in the customer support case, then the method 1600 continues to step 1640. In step 1640, the training module determines whether the humanoid had a correct answer for at least a threshold amount of questions (e.g., 85% of the questions, though the threshold could be another value above 85% or below 85%) in the customer support case. If the training module determines that the humanoid did not have a correct answer for at least a threshold amount of questions, then the method 1600 continues to step 1645 where the training module determines, and records (e.g., in a database or other storage mechanism), that the humanoid is not adequately trained for the customer support case.

If the training module determines in step 1640 that the humanoid had a correct answer for at least a threshold amount of questions, then the method 1600 continues to step 1650 where the training module determines, and records (e.g., in a database or other storage mechanism), that the humanoid is adequately trained for the customer support case. In step 1655, the training module looks back at a previous set of customer support cases (e.g., a most recent 50 customer support cases, though the amount of customer support cases can be above or below 50) and determines whether the humanoid had correct answers for at least a threshold amount (e.g., 80%, though the threshold could be another value above 80% or below 80%) of the questions in the customer support cases. If the training module determines that the humanoid did not have correct answers for at least the threshold amount of questions, then the method 1600 continues to step 1660 where the training module determines, and records (e.g., in a database or other storage mechanism), that the humanoid is not adequately trained for the customer support campaign. If the training module determines in step 1655 that the humanoid had correct answers for at least the threshold amount of questions, then the method 1600 continues to step 1665 where the training module determines, and records (e.g., in a database or other storage mechanism), that the humanoid is adequately trained for the customer support campaign. For example, step 1665 may involve provisioning the humanoid for handling future customer support cases in the customer support campaign.

As would be recognized by a person of skill in the art, the steps associated with the methods of the present disclosure, including method 1200, method 1300, method 1400, method 1500, and method 1600, may vary widely. Steps may be added, removed, altered, combined, and reordered without departing from the spirit or the scope of the present disclosure. Therefore, the example methods are to be considered illustrative and not restrictive, and the examples are not to be limited to the details given herein but may be modified within the scope of the appended claims.

Figure 17:
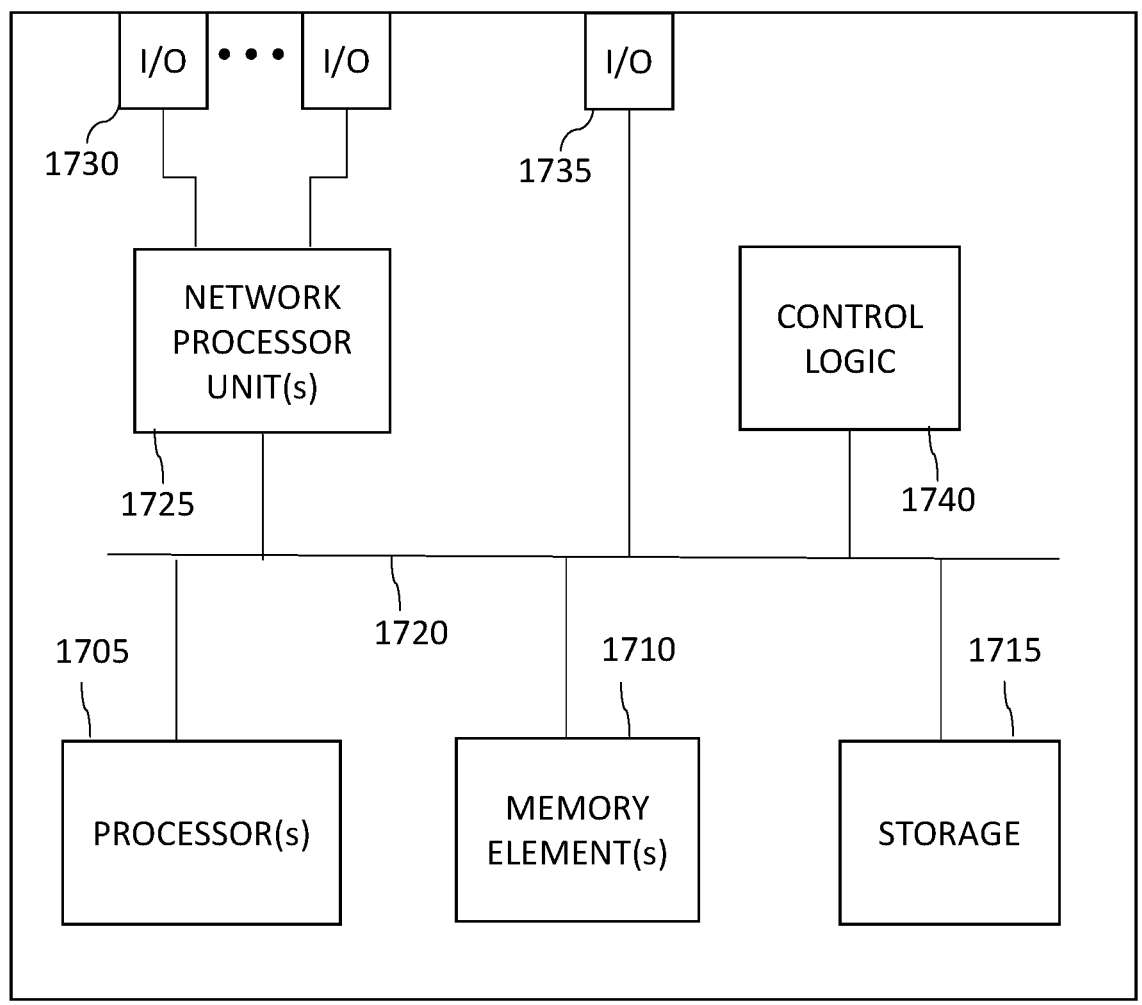
FIG. 17 is a hardware block diagram of a computing device that may perform functions associated with any combination of operations, in connection with the techniques depicted in FIGS. 1-16, according to an example embodiment.

Referring to FIG. 17, FIG. 17 illustrates a hardware block diagram of a computing device 1700 that may perform functions associated with operations discussed herein in connection with the techniques depicted in FIGS. 1-16. In various example embodiments, a computing device, such as computing device 1700 or any combination of computing devices 1700, may be configured as any entity/entities as discussed for the techniques depicted in connection with FIGS. 1-16, such as the humanoid system 150 or one or more of the modules or other components thereof, in order to perform operations of the various techniques discussed herein.

In at least one embodiment, computing device 1700 may include one or more processor(s) 1705, one or more memory element(s) 1710, storage 1715, a bus 1720, one or more network processor unit(s) 1725 interconnected with one or more network input/output (I/O) interface(s) 1730, one or more I/O interface(s) 1735, and control logic 1740. In various embodiments, instructions associated with logic for computing device 1700 can overlap in any manner and are not limited to the specific allocation of instructions and/or operations described herein.

In at least one embodiment, processor(s) 1705 is/are at least one hardware processor configured to execute various tasks, operations and/or functions for computing device 1700 as described herein according to software and/or instructions configured for computing device. Processor(s) 1705 (e.g., a hardware processor) can execute any type of instructions associated with data to achieve the operations detailed herein. In one example, processor(s) 1705 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term "processor."

In at least one embodiment, memory element(s) 1710 and/or storage 1715 is/are configured to store data, information, software, and/or instructions associated with computing device 1700, and/or logic configured for memory element(s) 1710 and/or storage 1715. For example, any logic described herein (e.g., control logic 1740) can, in various embodiments, be stored for computing device 1700 using any combination of memory element(s) 1710 and/or storage 1715. Note that in some embodiments, storage 1715 can be consolidated with memory element(s) 1710 (or vice versa), or can overlap/exist in any other suitable manner.

In at least one embodiment, bus 1720 can be configured as an interface that enables one or more elements of computing device 1700 to communicate in order to exchange information and/or data. Bus 1720 can be implemented with any architecture designed for passing control, data and/or information between processors, memory elements/storage, peripheral devices, and/or any other hardware and/or software components that may be configured for computing device 1700. In at least one embodiment, bus 1720 may be implemented as a fast kernel-hosted interconnect, potentially using shared memory between processes (e.g., logic), which can enable efficient communication paths between the processes.

In various embodiments, network processor unit(s) 1725 may enable communication between computing device 1700 and other systems, entities, etc., via network I/O interface(s) 1730 to facilitate operations discussed for various embodiments described herein. In various embodiments, network processor unit(s) 1725 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 1700 and other systems, entities, etc. to facilitate operations for various embodiments described herein. In various embodiments, network I/O interface(s) 1730 can be configured as one or more Ethernet port(s), Fibre Channel ports, and/or any other I/O port(s) now known or hereafter developed. Thus, the network processor unit(s) 1725 and/or network I/O interfaces 1730 may include suitable interfaces for receiving, transmitting, and/or otherwise communicating data and/or information in a network environment.

I/O interface(s) 1735 allow for input and output of data and/or information with other entities that may be connected to computer device 1700. For example, I/O interface(s) 1735 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 1740 can include instructions that, when executed, cause processor(s) 1705 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 1740) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term "memory element." Data/information being tracked and/or sent to one or more entities as discussed herein could be provided in any database, table, register, list, cache, storage, and/or storage structure: all of which can be referenced at any suitable timeframe. Any such storage options may also be included within the broad term "memory element" as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software (potentially inclusive of object code and source code), etc.) for execution by one or more processor(s), and/or other similar machine, etc. Generally, memory element(s) 1710 and/or storage 1715 can store data, software, code, instructions (e.g., processor instructions), logic, parameters, combinations thereof, and/or the like used for operations described herein. This includes memory element(s) 1710 and/or storage 1715 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In summary, in one form, a computer-implemented method includes training a humanoid of a customer support system for a customer support campaign. The humanoid includes a computer executed process that mimics human dialog. The training includes the humanoid observing communications between a human operator and at least one customer regarding at least one customer support case in the customer support campaign. The humanoid can assess at least one confidence level of the humanoid for the customer support campaign to determine whether the humanoid is adequately trained to handle future customer support cases for the customer support campaign. The humanoid can provision itself to handle at least one future customer support case in the customer support campaign in response to the humanoid determining that it is adequately trained for the customer support campaign.

The training can include, for example, the humanoid: selecting a question from the communications; determining whether the question is similar to a known question associated with the customer support campaign; and causing the question and an answer to the question to be stored in association with the customer support campaign in response to determining that the question is similar to a known question associated with the customer support campaign. The training can further include the humanoid including the question in a grouping of similar questions associated with the customer support campaign. In an example embodiment, the training also can include the humanoid determining a best answer for the grouping of similar questions. In addition, or in the alternative, the humanoid can identify a best answer for a question from the communications. In either case, the humanoid can the best answer to be displayed to the human operator for potential provision by the human operator to the customer. A logic of the humanoid may be refined based on whether the human operator provides the best answer to the customer.

Assess the confidence level(s) of the humanoid for the customer support campaign can include, for example, determining whether the humanoid would be able to resolve at least a predetermined threshold number of previous customer support cases. Determining whether the humanoid would be able to resolve at least the predetermined threshold number of previous customer support cases can include, e.g., determining, for each particular one of the at least the predetermined threshold number of previous customer support cases, whether the humanoid would provide at least a predetermined threshold amount of correct answers to questions in the particular one of the at least the predetermined threshold number of previous customer support cases. Determining whether the humanoid would provide at least a predetermined threshold amount of correct answers to questions can include, e.g., determining, for each particular one of the questions, whether the humanoid knows an answer to the particular question with a confidence above a predetermined threshold.

In another form, an apparatus comprises a communication interface configured to enable network communications, and one or more memories configured to store data. The apparatus further comprises one or more processors coupled to the communication interface and memory and configured to perform operations on behalf of a humanoid of a customer support system, the humanoid comprising a computer executed process that mimics human dialog, the operations including: causing the humanoid to train itself for a customer support campaign by observing communications between a human operator and at least one customer regarding at least one customer support case in the customer support campaign; causing the humanoid to assess at least one confidence level of the humanoid for the customer support campaign to determine whether the humanoid is adequately trained to handle future customer support cases for the customer support campaign; and causing the humanoid to provision itself to handle at least one future customer support case in the customer support campaign in response to the humanoid determining that it is adequately trained for the customer support campaign.

In another form, one or more non-transitory computer readable storage media include instructions that, when executed by at least one processor, are operable to: cause a humanoid of a customer support system to train itself for a customer support campaign by observing communications between a human operator and at least one customer regarding at least one customer support case in the customer support campaign, the humanoid comprising a computer executed process that mimics human dialog; cause the humanoid to assess at least one confidence level of the humanoid for the customer support campaign to determine whether the humanoid is adequately trained to handle future customer support cases for the customer support campaign; and cause the humanoid to provision itself to handle at least one future customer support case in the customer support campaign in response to the humanoid determining that it is adequately trained for the customer support campaign.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A computer-implemented method comprising:
    self-training, by a humanoid of a customer support system, for a customer support campaign, the self-training comprising the humanoid observing communications between a human operator and at least one customer regarding at least one customer support case in the customer support campaign, the humanoid comprising a computer executed process that mimics human dialog, the customer support system including a database storing a plurality of machine learning models, each machine learning model being associated with a particular customer support campaign of a plurality of customer support campaigns;
    determining, by a training module of the humanoid, for each question of a plurality of questions associated with a particular customer support case of the customer support campaign, whether the humanoid has provided a correct answer to the question using a machine learning model associated with the customer support campaign, wherein a correct answer has a confidence score greater than a particular level;
    retraining, by the training module of the humanoid, the humanoid based on a feedback loop, wherein retraining the humanoid based on the feedback loop comprises:
        increasing, by the humanoid, a confidence level associated with the humanoid for the customer support campaign when the humanoid has provided the correct answer to the question, and
        when the humanoid has not provided the correct answer to the question:
            decreasing, by the humanoid, the confidence level associated with the humanoid, and
            refining, by the humanoid, logic associated with the humanoid;
    determining, by the training module of the humanoid, whether a percentage of the correct answers provided by the humanoid is greater than a particular percentage;
    determining, by the training module of the humanoid, that the humanoid is trained for the particular customer support case in response to determining that the percentage of correct answers provided by the humanoid is greater than the particular percentage;
    determining, in response to determining that the humanoid is trained for the particular customer support case, whether the humanoid has reviewed a number of customer support cases for the customer support campaign that is greater than a threshold number of customer support cases;
    self-training, by the humanoid, for the customer support campaign in response to determining that the humanoid has not reviewed a number of customer support cases for the customer support campaign that is greater than the threshold number of customer support cases;
    determining, by the training module of the humanoid, that the humanoid is adequately trained to handle future customer support cases for the customer support campaign in response to determining that humanoid has reviewed a number of customer support cases for the customer support campaign that is greater than the threshold number of customer support cases;
    the humanoid provisioning itself to handle at least one future customer support case in the customer support campaign in response to the humanoid determining that it is adequately trained for the customer support campaign;
    receiving, by the humanoid and from a customer, a request for customer support associated with the customer support campaign, the request indicating a customer support issue;
    interpreting, by the humanoid, information in the request for customer support; and
    activating, by the humanoid, a plugin based on interpreting the information in the request, the plugin processing files associated with the customer and identifying a cause of the customer support issue.

2. The computer-implemented method of claim 1, wherein the self-training further comprises the humanoid:
    selecting a question from the communications;
    determining whether the question is similar to a known question associated with the customer support campaign; and
    causing the question and an answer to the question to be stored in association with the customer support campaign in response to determining that the question is similar to a known question associated with the customer support campaign.

3. The computer-implemented method of claim 2, wherein the self-training further comprises the humanoid including the question in a grouping of similar questions associated with the customer support campaign.

4. The computer-implemented method of claim 3, wherein the self-training further comprises the humanoid determining a best answer for the grouping of similar questions.

5. The computer-implemented method of claim 1, further comprising:
   identifying, by the humanoid, a best answer for a question from the at least one customer in the communications; and
   causing the best answer to be displayed to the human operator for potential provision by the human operator.

6. The computer-implemented method of claim 5, wherein the self-training further comprises refining a logic of the humanoid based on whether the human operator provides the best answer.

7. The computer-implemented method of claim 1, further comprising the humanoid handling the at least one future customer support case in the customer support campaign in response to the provisioning.

8. The computer-implemented method of claim 1, further comprising:
   activating, by the humanoid, a function associated with the humanoid to enable automatic handling by the humanoid of the future customer support cases in the customer support campaign in response to determining that the humanoid is adequately trained to handle future customer support cases for the customer support campaign.

9. An apparatus comprising:
   a communication interface configured to enable network communications;
   one or more memories configured to store data and a plurality of machine learning models, each machine learning model being associated with a particular customer support campaign of a plurality of customer support campaigns; and
   one or more processors coupled to the communication interface and memory and configured to perform operations on behalf of a humanoid of a customer support system, the humanoid comprising a computer executed process that mimics human dialog, the operations including:
      causing the humanoid to train itself for a customer support campaign of the plurality of customer support campaigns by observing communications between a human operator and at least one customer regarding at least one customer support case in the customer support campaign;
      causing the humanoid to determine, for each question of a plurality of questions associated with a particular customer support case of the customer support campaign, whether the humanoid has provided a correct answer to the question using a machine learning model associated with the customer support campaign, wherein a correct answer is an answer with a confidence score greater than a particular level;
      causing the humanoid to retrain itself based on a feedback loop, wherein causing the humanoid to retrain itself based on the feedback loop comprises:
         causing the humanoid to increase a confidence level associated with the humanoid when the humanoid has provided the correct answer to the question, and
         when the humanoid has not provided the correct answer:
            causing the humanoid to decrease the confidence level associated with the humanoid, and
            causing the humanoid to refine logic associated with itself;
      causing the humanoid to determine whether a percentage of the correct answers provided by the humanoid is greater than a particular percentage;
      causing the humanoid to determine that the humanoid is trained for the particular customer support case in response to determining that the percentage of correct answers provided by the humanoid is greater than the particular percentage;
      causing the humanoid to determine, in response to determining that the humanoid is trained for the particular customer support case, whether the humanoid has reviewed a number of customer support cases for the customer support campaign that is greater than a threshold number of customer support cases;
      causing the humanoid to continue to train itself for the customer support campaign in response to determining that the humanoid has not reviewed a number of customer support cases for the customer support campaign that is greater than the threshold number of customer support cases;
      causing the humanoid to determine that the humanoid is adequately trained to handle future customer support cases for the customer support campaign in response to determining that the humanoid has reviewed a number of customer support cases for the customer support campaign that is greater than the threshold number of customer support cases;
      causing the humanoid to provision itself to handle at least one future customer support case in the customer support campaign in response to the humanoid determining that it is adequately trained for the customer support campaign;
      causing the humanoid to obtain, from a customer, a request for customer support associated with the customer support campaign, the request indicating a customer support issue;
      causing the humanoid to interpret information in the request for customer support; and
      causing the humanoid to activate a plugin based on interpreting the information in the request, the plugin processing files associated with the customer and identifying a cause of the customer support issue.

10. The apparatus of claim 9, wherein the one or more processors are further configured to cause the humanoid to, in response to observing the communications:
    select a question from the communications;
    determine whether the question is similar to at least one known question associated with the customer support campaign; and
    cause the question and an answer to the question to be stored in a grouping with the at least one known question, in association with the customer support campaign, in response to determining that the question is similar to the at least one known question.

11. The apparatus of claim 10, wherein the one or more processors are further configured to cause the humanoid to determine a best answer for the grouping.

12. The apparatus of claim 11, wherein the one or more processors are further configured to cause the best answer to be displayed to the human operator for potential provision by the human operator.

13. The apparatus of claim 12, wherein the one or more processors are further configured to refine a logic of the humanoid based on whether the human operator provides the best answer.

14. The apparatus of claim 9, wherein the one or more processors are further configured to perform operations including causing the humanoid to handle the at least one future customer support case in the customer support campaign.

15. The apparatus of claim 9, wherein the one or more processors are further configured to perform operations including causing the humanoid to activate a function associated with the humanoid to enable automatic handling by the humanoid of the future customer support cases in the customer support campaign in response to determining that the humanoid is adequately trained to handle future customer support cases for the customer support campaign.

16. One or more non-transitory computer readable storage media comprising instructions that, when executed by at least one processor, are operable to:
cause a humanoid of a customer support system to train itself for a customer support campaign by observing communications between a human operator and at least one customer regarding at least one customer support case in the customer support campaign, the humanoid comprising a computer executed process that mimics human dialog, the customer support system including a database storing a plurality of machine learning models, each machine learning model being associated with a particular customer support campaign of a plurality of customer support campaigns;
cause the humanoid to determine, for each question of a plurality of questions associated with a particular customer support case of the customer support campaign, whether the humanoid has provided a correct answer to the question using a machine learning model associated with the customer support campaign, wherein a correct answer is an answer with a confidence level greater than a particular level;
cause the humanoid to retrain itself based on a feedback loop, wherein, when causing the humanoid to retrain itself based on the feedback loop, the instructions are operable to:
cause the humanoid to increase a confidence level associated with the humanoid when the humanoid has provided the correct answer to the question, and when the humanoid has not provided the correct answer:
cause the humanoid to decrease the confidence level associated with the humanoid, and
cause the humanoid to refine logic associated with itself;
cause the humanoid to determine whether a percentage of the correct answers provided by the humanoid is greater than a particular percentage;
cause the humanoid to determine that the humanoid is trained for the particular customer support case in response to determining that the percentage of correct answers provided by the humanoid is greater than the particular percentage;
cause the humanoid to determine, based on determining that the humanoid is trained for the particular customer support case, whether the humanoid has reviewed a number of customer support cases for the customer support campaign that is greater than a threshold number of customer support cases;
cause the humanoid to continue to train itself for the customer support campaign in response to determining that the humanoid has not reviewed a number of customer support cases for the customer support campaign that is greater than the threshold number of customer support cases;
cause the humanoid to determine that the humanoid is adequately trained to handle future customer support cases for the customer support campaign in response to determining that the humanoid has reviewed a number of customer support cases for the customer support campaign that is greater than the threshold number of customer support cases;
cause the humanoid to provision itself to handle at least one future customer support case in the customer support campaign in response to the humanoid determining that it is adequately trained for the customer support campaign;
cause the humanoid to obtain, from a customer, a request for customer support associated with the customer support campaign, the request indicating a customer support issue;
cause the humanoid to interpret information in the request for customer support; and
cause the humanoid to activate a plugin based on interpreting the information in the request, the plugin processing files associated with the customer and identifying a cause of the customer support issue.

17. The one or more non-transitory computer readable storage media of claim 16, wherein the instructions further cause the at least one processor to:
select a question from the communications;
determine whether the question is similar to at least one known question associated with the customer support campaign; and
cause the question and an answer to the question to be stored in a grouping with the at least one known question, in association with the customer support campaign, in response to determining that the question is similar to the at least one known question.

18. The one or more non-transitory computer readable storage media of claim 17, wherein the instructions further cause the at least one processor to:
cause the humanoid to determine a best answer for the grouping; and
cause the best answer to be displayed to the human operator for potential provision by the human operator.

19. The one or more non-transitory computer readable storage media of claim 18, wherein the instructions further cause the at least one processor to refine a logic of the humanoid based on whether the human operator provides the best answer.

20. The one or more non-transitory computer readable storage media of claim 18, wherein the instructions further cause the at least one processor to cause the humanoid to handle the at least one future customer support case in the customer support campaign.

21. The one or more non-transitory computer readable storage media of claim 18, wherein the instructions further cause the at least one processor to cause the humanoid to activate a function associated with the humanoid to enable automatic handling by the humanoid of the future customer support cases in the customer support campaign in response to determining that the humanoid is adequately trained to handle future customer support cases for the customer support campaign.

\* \* \* \* \*